Patented Nov. 13, 1951

2,574,538

UNITED STATES PATENT OFFICE 2,574,538

PROCESSES FOR BREAKING PETROLEUM EMULSIONS

Melvin De Groote, University City, and Arthur F. Wirtel, Kirkwood, Mo., assignors to Petrolite Corporation, Ltd., Wilmington, Del., a corporation of Delaware No Drawing. Application June 15, 1949, Serial No. 99,361

14 Claims. (Cl. 252—342)

This invention relates to processes or procedures particularly adapted for preventing, breaking, or resolving emulsions of the water-in-oil type, and particularly petroleum emulsions.

Complementary to the above aspect of the invention herein disclosed is our companion invention concerned with new chemical products or compounds used as demulsifying agents in said aforementioned processes or procedures, as well as the application of such chemical compounds, products, and the like, in various other arts and industries, along with the method of manufacturing said new chemical products or compounds which are of outstanding value in demulsification. See our co-pending application, Serial No. 99,362, filed June 15, 1949.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

Briefly stated the present process is concerned with breaking or resolving petroleum emulsions by means of a mixture, one component of which by itself has substantially little or no demulsifying effect, and the second component, although recognized as a demulsifier, admixed in minor proportions with the previously mentioned compound or mixture, yields products unexpectedly having very effective demulsifying action on certain types of oils where the individual members have little or no action.

Specifically, oils where this particular property is noticeable are found in one or more of the following localities: At or near the Shuler Field (Eldorado), Arkansas; Conroe, Texas; Old Ocean, Texas, etc.

The first component of the mixture which is present to a minor degree and represents not more than 33⅓% of the mixture, and preferably represents 25% of the mixture, is the compound described in U. S. Patent No. 2,442,073, dated May 25, 1948, to De Groote and Wirtel. The first claim in this particular patent describes the compound as ". . . an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from an hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical."

The second component which constitutes the major proportion of the compound, to wit, at least 66⅔% or more, and preferably 75%, is a product described in co-pending application of De Groote and Keiser, Serial No. 42,131, filed August 2, 1948, and is identified therein as ". . . oxyalkylation products of (A) An alpha-beta alkylene oxide having not more than 4 carbon atoms and selected from the class consisting of ethylene oxide, glycide and methylglycide; and (B) An oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

in which R is a hydrocarbon radical having at least 4 and not more than 18 carbon atoms and substituted in the 2,4,6 position; said oxyalkylated resin being characterized by the introduction into the resin molecule of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than 2 moles of alkylene oxide be introduced for each phenolic nucleus."

Having obtained the two products or types of materials specified, mixture is made within the range hereinafter specified.

For purpose of convenience, what is said hereinafter will be divided into five parts. Parts 1 and 2 will be concerned with the production of the oxyalkylated resin in which Part 1 is concerned with the production of the resin from a difunctional phenol and an aldehyde, and Part 2 with the oxyalkylation of the resin so as to convert it into a product having the properties hereinafter described, and particularly the derivatives obtained by the use of one mole of an oxyalkylating agent, particularly ethylene oxide, for each phenolic hydroxyl; Part 3 will be concerned with the preparation of the partial acidic esters previously referred to and described in U. S. Patent No. 2,442,073; Part 4 will be concerned with the preparation of the mechanical mixtures by appropriate combinations; and Part 5 will be concerned with the use of such mixtures as demulsifiers, as hereinafter described.

For convenience of comparison, much of what appears in Parts 1 and 2 will be substantially the verbatim text as it appears in aforementioned De Groote and Keiser application Serial No. 42,131, filed August 2, 1948.

PART 1

The particular materials employed as the hydroxylated or major constituent in preparation of the instant mixtures, are oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

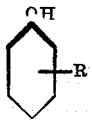

in which R is a hydrocarbon radical having at least 4 and not more than 10 carbon atoms and substituted in the 2, 4, 6 position; said resin being reacted with the aforementioned alkylene oxide in such proportion as to convert at least a majority of the phenolic hydroxyls per resin molecule into aliphatic hydroxyl radicals, and in such proportion that less than two moles of the alkylene oxide are used for each phenolic hydroxyl.

We have found that if solvent-soluble resins are prepared from difunctional (direactive) phenols in which one of the reactive (o or p) positions of the phenol is substituted by a hydrocarbon radical having 4 to 18 carbon atoms, in the substantial absence of trifunctional phenols, and aldehydes having not over 8 carbon atoms, subsequent oxyalkylation, and specifically oxyethylation with at least one-half but less than 2 moles of alkylene oxide per phenolic nucleus, yields products which are of value as intermediates. By "substantial absence of trifunctional phenols" we mean that such materials may be present only in amounts so small that they do not interfere with the formation of a solvent-soluble resin product. The actual amounts to be tolerated will, of course, vary with the nature of the other components of the system; but in general, the proportion of trifunctional phenols which is tolerable in the conventional resinification procedures illustrated herein is quite small. In experiments following conventional procedure using an acid catalyst in which we have included trifunctional phenols in amounts of from 3% to about 1% or somewhat less, based on the difunctional phenols, we have encountered difficulties in preparing oxyalkylated derivatives of the type included in this invention.

Such products are rarely a single chemical compound but are almost invariably a mixture of cogeners. One useful type of parent resin may be exemplified in an idealized simplification in the following formula:

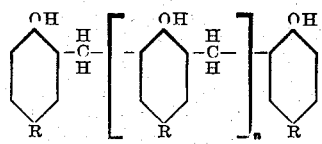

In this formula, $n$ represents a numeral varying from 1 to 13, or even more, provided that the resin is fusible and organic solvent-soluble; and R is a hydrocarbon radical having at least 4 and not over 18 carbon atoms. These numerical values of $n$ are, of course, on a statistical basis. Such resins are oxyalkylated with at least ½ but less than 2 moles of alkylene oxide per phenolic hydroxyl equivalent to produce the intermediates of the invention.

The products of the present invention are oxyalkylated 2,4,6 (i. e., 2,4, or 6) $C_4$- to $C_{18}$-hydrocarbon substituted monocyclic phenol—$C_1$- to $C_8$-aldehyde resins in which the ratio of oxyalkylene groups to phenolic nuclei is at least 0.5:1 but is less than 2:1, and the alkylene radicals of the oxyalkylene groups are ethylene, propylene, butylene, hydroxypropylene or hydroxybutylene corresponding to the alpha-beta alkylene oxides, ethylene oxide, alpha-beta propylene oxide, alpha-beta butylene oxide, glycide and methylglycide.

The specified intermediates are the products obtained by the oxyalkylation of certain resins, which, in turn, are derived by chemical reaction between difunctional monohydric phenols and a reactive aldehyde, such as formaldehyde, nearby homologues, and their equivalents. The phenolic reactant is characterized by one ortho-para nuclear hydrocarbon substituent having not less than 4 carbon atoms and not more than 18 carbon atoms. Usually the phenolic reactants are derivatives of hydroxybenzene, i. e., ordinary phenol, and they are usually obtained by reaction of phenol with an olefine or an organic chloride in presence of a metallic halide or condensing agent; but similar phenolic reactants obtained from metacresol or 3,5-xylenol are equally satisfactory for the reason that such phenols are still difunctional (direactive) and the presence of the single or even both methyl radicals does not materially affect the finished intermediates or products derived thereform. The hydrocarbon substituent having 4 to 18 carbon atoms may be alkyl, alkylene, aryl, alicyclic, or aralkyl.

In producing the parent phenol-aldehyde resins, any aldehyde capable of forming a methylol or a substituted methylol group and having not more than 8 carbon atoms is satisfactory, so long as it does not possess some other functional group or structure which will conflict with the resinification reaction, or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalis. On the other hand, higher aldehydes frequently beneficially affect the solubility and fusibility of a resin. This is illustrated, for example, by the different characteristics of the resin prepared from paratertiary amyl phenol and formaldehyde on one hand, and a comparable product prepared from the same phenolic reactant and heptaldehyde on the other hand. The former, as shown in certain subsequent examples, is a hard, brittle solid, whereas, the latter is softer and more tacky, and obviously easier to handle in the subsequent oxyalkylation procedure.

Cyclic aldehydes may be employed, particularly benzaldehyde. The employment of furfural requires careful control, for the reason that, in addition to its aldehydic function, furfural can form vinyl condensations by virtue of its unsaturated structure. The production of resins from furfural for use in preparing the present products of invention is most conveniently conducted with weak alkaline catalysts and often with alkali metal carbonates. Useful aldehydes, in addition to formaldehyde, are acetaldehyde, propionaldehyde, butyraldehyde, 2-ethylhexanol, ethylbutyraldehyde, heptaldehyde, benzaldehyde, furfural and glyoxal. It would appear that the use of glyoxal should be avoided, due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes, although usually this has no advantage.

Resins of the kind which are used as starting materials to produce the intermediates of this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts they enter into the condensation reaction, and, in fact, may operate by initial combination with the aldehydic reactant. The compound hexamethylenetetramine illustrates such a combination. In light of these various reactions, it becomes difficult to present any formula which would depict the structure of the various resins prior to oxalkylation. More will be said subsequently as to the difference between the use of an alkaline catalyst and an acid catalyst; even in the use of an alkaline catalyst there is considerable evidence to indicate that the products are not identical where different basic materials are employed. The basic materials employed include not only those previously enumerated, but also the hydroxides of the alkali metals, hydroxides of the alkali metals, hydroxides of the alkaline earth metals, salts of strong bases and weak acids such as sodium acetate, etc. Where light-colored products are desired, oxalic acid will be found valuable as a catalyst.

Suitable phenolic reactants include the following: Para-tertiary-butylphenol; para-secondary-butylphenol; para-tertiary-amylphenol; para-secondary-amylphenol-para-tertiary-hexylphenol; para-isooctyl-phenol; ortho-phenylphenol; para-phenylphenol; ortho-benzylphenol; para-benzylphenol; and para-cyclohexylphenol; para-decylphenol; para-dodecyl-phenol; para-tetradecyl-phenol; para-octadecyl-phenol; para-nonyl-phenol; para-methyl-phenol; para-beta-naphthyl-phenol; para-alpha-naphthyl-phenol; para-pentadecyl-phenol; that of the formula:

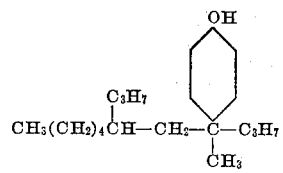

para- and ortho-cetyl-phenols; para-cumyl-phenol; phenols of the formula:

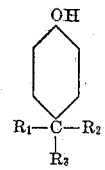

in which $R_1$ represents a straight chain hydrocarbon radical containing at least 7 carbon atoms and $R_2$ and $R_3$ represent hydrocarbon radicals, the total number of carbon atoms attached to the tertiary carbon being at least 11 and not more than 17; and phenols of the formula:

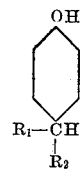

in which $R_1$ represents an alkyl hydrocarbon radical containing at least 7 carbon atoms in a straight chain and $R_2$ represents an alkyl hydrocarbon radical containing at least 2 carbon atoms, the total number of carbon atoms in $R_1$ and $R_2$ being at least 11 and not more than 17; and the corresponding - ortho - para - substituted meta-cresols and 3,5-xylenols.

For convenience, the phenol has previously been referred to as monocyclic, in order to differentiate from fused nucleus polycyclic phenols, such as substituted naphthols. Specifically, "monocyclic" is limited to the nucleus in which the hydroxyl radical is attached. Broadly speaking, where a substituent is cyclic, particularly aryl, obviously in the usual sense, such phenol is actually polycyclic, although the phenolic hydroxyl is not attached to a fused polycyclic nucleus. Stated another way, phenols in which the hydroxyl group is directly attached to a condensed or fused polycyclic structure, are excluded. This matter, however, is clarified by the following consideration. The phenols herein contemplated for reaction may be indicated by the following formula:

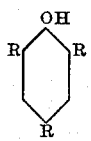

in which R is selected from the class consisting of hydrogen atoms and hydrocarbon radicals having at least 4 carbon atoms and not more than 18 carbon atoms, with the proviso that one occurrence of R is the hydrocarbon substituent and the other two occurrences are hydrogen atoms, and with the further provision that one or both of the 3 and 5 positions may be methyl-substituted.

The above formula possibly can be restated more conveniently in the following manner, to wit, that the phenol employed is of the following formula, with the proviso that R is a hydrocarbon substituent located in the 2,4,6 position, again with the provision as to 3 or 3,5 methyl substitution. This is conventional nomenclature, numbering the various positions in the usual clockwise manner, beginning with the hydroxyl position as one:

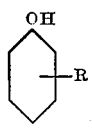

The manufacture of thermoplastic phenol-aldehyde resins, particularly from formaldehyde and a difunctional phenol, i. e., a phenol in which one of the three reactive positions (2,4,6) has been substituted by a hydrocarbon group, and particularly by one having at least 4 carbon atoms and not more than 18 carbon atoms, is well known. As has been previously pointed out, there is no objection to a methyl radical provided it is present in the 3 or 5 position.

Thermoplastic or fusible phenol-aldehyde resins are usually manufactured for the varnish trade and oil solubility is of prime importance. For this reason, the common reactants employed are butylated phenols, amylated phenols, phenylphenols, etc. The methods employed in manufacturing such resins are similar to those employed in the manufacture of ordinary phenol-formaldehyde resins, in that either an acid or alkaline catalyst is usually employed. The procedure usually differs from that employed in the manufacture of ordinary phenol-aldehyde resins, in that phenol, being water-soluble, reacts readily with an aqueous aldehyde solution without further difficulty, while when a water-insoluble phenol is employed some modification is usually adopted to increase the interfacial surface, and thus cause reaction to take place. A common solvent is sometimes employed. Another procedure employs rather severe agitation to create a large interfacial area. Once the reaction starts to a moderate degree, it is possible that both reactants are somewhat soluble in the partially reacted mass and assist in hastening the reaction. We have found it desirable to employ a small proportion of an organic sulfo-acid as a catalyst, either alone or along with an acid like oxalic or hydrochloric acid. For example, alkylated aromatic sulfonic acids are effectively employed, as are the sulfosuccinic esters. Since commercial forms of such acids are commonly their alkali salts, it is sometimes convenient to use a small quantity of such alkali salt, plus a small quantity of acid, as shown in the examples below. If desired, such organic sulfo-acids may be prepared in situ in the phenol employed, by reacting concentrated sulfuric acid with a small proportion of the phenol. In such cases where xylene is used as a solvent and concentrated sulfuric acid is employed, some sulfonation of the xylene probably occurs to produce the sulfo-acid. Addition of a solvent such as xylene is advantageous, as hereinafter described in detail. Another variation of procedure is to employ such organic sulfo-acids, in the form of their salts, in connection with an alkali-catalyzed resinification procedure. Detailed examples are included subsequently.

Another advantage in the manufacture of the thermoplastic or fusible type of resin by the acid catalytic procedure is that, since a difunctional phenol is employed, an excess of an aldehyde, for instance, formaldehyde, may be employed without too marked a change in conditions of reaction and ultimate product. There is usually little, if any, advantage, however, in using an excess over and above the stoichiometric proportions, for the reason that such excess may be lost and wasted. For all practical purposes, the molar ratio of formaldehyde to phenol may be limited to the range 0.9 to 1.2, with 1.05 as the preferred ratio. Sometimes when higher aldehydes are used an excess of aldehydic reactant can be distilled off and thus recovered from the reaction mass. This same procedure may be used with formaldehyde and excess reactant recovered.

When an alkaline catalyst is used, the amount of aldehyde, particularly formaldehyde, may be increased over the simple stoichiometric ratio of one-to-one or thereabouts. With the use of alkaline catalyst it has been recognized that considerably increased amounts of formaldehyde may be used, as much as two moles of formaldehyde, for example, per mole of phenol, or even more, with the result that only a small part of such aldehyde remains uncombined or is subsequently liberated during resinification. Structures which have been advanced to explain such increased use of aldehydes are the following:

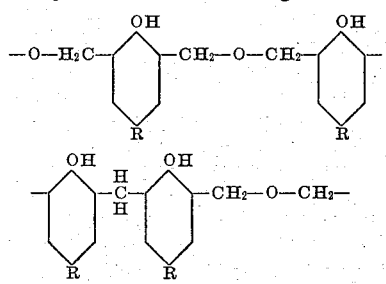

Such structures may lead to the production of cyclic polymers instead of linear polymers. For this reason, it has been previously pointed out that, although linear polymers have by far the most important significance, the present invention does not exclude resins of such cyclic structures.

Sometimes conventional resinification procedure is employed using either acid or alkaline catalysts to produce low-stage resins. Such resins may be employed as such, or may be altered or converted into high-stage resins, or in any event, into resins of higher molecular weight, by heating along with the employment of vacuum so as to split off water or formaldehyde, or both. Generally speaking, temperatures employed, particularly with vacuum, may be in the neighborhood of 175° to 250° C., or thereabouts.

It may be well to point out, however, that the amount of aldehyde used may and does usually affect the length of the resin chain. Increasing the amount of the aldehyde, such as formaldehyde, usually increases the size or molecular weight of the polymer.

In the hereto appended claims there is specified, among other things, the resin polymer containing at least 3 phenolic nuclei. Such minimum molecular size is most conveniently determined, as a rule, by cryoscopic method using benzene, or some other suitable solvent, for instance, one of those mentioned elsewhere herein as a solvent for such resins. As a matter of fact, using the procedures herein described or any conventional resinification procedure will yield products usually definitely in excess of 3 nuclei. In other words, a resin having an average of 4, 5 or 5½ nuclei per unit is apt to be formed as a minimum in resinification, except under certain special conditions where dimerization may occur.

However, if resins are prepared at substantially higher temperatures, substituting cymene, tetralin, etc., or some other suitable solvent which boils or refluxes at a higher temperature, for xylene, in subsequent examples, and if one doubles or triples the amount of catalyst, doubles or triples the time of refluxing, uses a marked excess of formaldehyde or other aldehyde, then the average size of the resin is apt to be distinctly over the above values, for example, it may average 7 to 15 units. Sometimes the expression "low-stage" resin or "low-stage" intermediate is employed to mean a stage having 6 or 7 units or even less. In the appended claims we have used "low-stage" to mean 3 to 7 units based on average molecular weight. These give the most desirable final products.

The molecular weight determinations, of course, require that the product be completely soluble in the particular solvent selected as, for instance, benzene. The molecular weight determination of such solution may involve either the freezing point as in the cryoscopic method, or, less conveniently perhaps, the boiling point in an ebullioscopic method. The advantage of the ebullioscopic method is that, in comparison with the cryoscopic method, it is more apt to insure complete solubility. One such common method to employ is that of Menzies and Wright (see J. American Chem. Soc. 43, 2309 and 2314 (1921)). Any suitable method for determining molecular weights will serve, although almost any procedure adapted has inherent limitations. A good method for determining the molecular weights of resins, especially solvent-soluble resins, is the cryoscopic procedure of Krumbhaar which employs diphenylamine as a solvent (see "Coating and Ink Resins," page 157, Reinhold Publishing Co., 1947).

Subsequent examples will illustrate the use of an acid catalyst, an alkaline catalyst, and no catalyst. As far as resin manufacture per se is concerned, we prefer to use an acid catalyst, and particularly a mixture of an organic sulfo-acid and hydrochloric or oxalic acid, along with a suitable solvent, such as xylene, as hereinafter illustrated in detail. However, we have obtained products from resins obtained by use of an alkaline catalyst which were satisfactory. Sometimes a combination of both types of catalyst is used in different stages of resinification. Resins so obtained are also satisfactory.

In numerous instances the higher molecular weight resins, i. e., those referred to as high-stage resins, are conveniently obtained by subjecting lower molecular weight resins to vacuum distillation and heating. Although such procedure sometimes removes only a modest amount or even perhaps no low polymer, yet it is almost certain to produce further polymerization. For instance, acid-catalyzed resins obtained in the usual manner and having a molecular weight indicating the presence of approximately 4 phenolic units or thereabouts may be subjected to such treatment, with the result that one obtains a resin having approximately double this molecular weight. The usual procedure is to use a secondary step, heating the resin in the presence or absence of an inert gas, including steam, or by use of vacuum.

We have found that under the usual conditions of resinification employing phenols of the kind here described, there is little or no tendency to form binuclear compounds, i. e., dimers, resulting from the combination, for example, of 2 moles of a phenol and one mole of aldehyde, particularly where the substituent has 4 or 5 carbon atoms. Where the number of carbon atoms in a substituent approximates the upper limit specified herein, there may be some tendency to dimerization. The usual procedure to obtain a dimer involves an enormously large excess of the phenol, for instance, 8 to 10 moles per mole of aldehyde. Substituted dihydroxydiphenylmethanes obtained from substituted phenols are not resins, as that term is used herein.

Although any conventional procedure ordinarily employed may be used in the manufacture of the herein used resins, or, for that matter, such resins may be purchased in the open market, we have found it particularly desirable to use the procedures described elsewhere herein, and employing a combination of an organic sulfo-acid and an acid as a catalyst, and xylene as a solvent. By way of illustration, certain subsequent examples are included, but it is to be understood the herein described invention is not concerned with the resins per se or with any particular method of manufacture, but is concerned with derivatives obtained by the subsequent oxyalkylation and esterification thereof. The phenol-aldehyde resins may be prepared in any suitable manner.

Oxyalkylation, particular oxyethylation which is the preferred reaction, depends on contact between a non-gaseous phase and a gaseous phase. It can, for example, be carried out by melting the thermoplastic resin and subjecting it to treatment with ethylene oxide or the like, or by treating a suitable solution or suspension. Since the melting points of the resins are often higher than desired in the initial stage of oxyethylation, we have found it advantageous to use a solution or suspension of thermoplastic resin in an inert solvent such as xylene. Under such circumstances, the resin obtained in the usual manner is dissolved by heating in xylene under a reflux condenser or in any other suitable manner. Since xylene or any equivalent inert solvent is present or may be present during oxyalklation, it is obvious there is no objection to having a solvent present during the resinifying stage, if, in addition to being inert towards the resin, it is also inert towards the reactants and also inert towards water. Such solvents are conveniently removed during some subsequent operation, if their removal is in fact required. Numerous solvents, particularly of aromatic or cyclic nature, are suitably adapted for such use. Examples of such solvents are xylene, cymene, ethyl benzene, propyl benzene, mesitylene, decalin (decahydronaphthalene), tetralin (tetrahydronaphthalene), ethylene glycol diethylether, diethylene glycol diethylether, and tetraethylene glycol dimethylether, or mixtures of one or more. Solvents such as dichloroethylether, or dichloropropylether may be employed either alone or in mixture, but have the objection that the chlorine atom in the compound may slowly combine with the alkaline catalyst employed in oxyethylation. Suitable solvents may be selected from this group for molecular weight determinations.

The use of such solvents is a convenient expedient in the manufacture of the thermoplastic resins, particularly since the solvent gives a more liquid reaction mass, and thus, prevents overheating, and also because the solvent can be employed in connection with a reflux condenser and a water trap to assist in the removal of water of reaction and also water present as part of the formaldehyde reactant when an aqueous solution of formaldehyde is used. Such aqueous solution, of course, with the ordinary product of commerce containing about 37½% to 40% formaldehyde, is the preferred reactant. When such solvent is used, it is advantageously added at the beginning of the resinification procedure or before the reaction has proceeded very far.

The solvent can be removed afterwards by distillation with or without the use of vacuum, and a final higher temperature can be employed to complete reaction, if desired. In many instances, it is most desirable to permit part of the solvent, particularly when it is inexpensive, e. g., xylene, to remain behind in a predetermined amount so as to have a resin which can be handled more coveniently in the oxyalkylation stage. If a more expensive solvent, such as decalin, is employed, xylene or other inexpensive solvent may be added after the removal of decalin, if desired.

In preparing resins from difunctional phenols it is common to employ reactants of technical grade. The substituted phenols herein contemplated are usually derived from hydroxybenzene. As a rule, such substituted phenols are comparatively free from unsubstituted phenol. We have generally found that the amount present is considerably less than 1% and not infrequently in the neighborhood of $\frac{1}{10}$ of 1%, or even less. The amount of the usual trifunctional phenol, such as hydroxybenzene or metacresol, which can be tolerated is determined by the fact that actual cross-linking, if it takes place even infrequently, must not be sufficient to cause insolubility at the completion of the resinification stage or at a subsequent stage.

The exclusion of such trifunctional phenols as hydroxybenzene or metacresol is not based on the fact that the mere random or occasional inclusion of an unsubstituted phenyl nucleus in the resin molecule or in one of several molecules, for example, markedly alters the characteristics of the final derivative. The presence of a phenyl radical having a reactive hydrogen atom available or having a hydroxymethylol or a substituted hydroxymethylol group present is a potential source of cross-linking either during resinification, oxyalkylation, or some other subsequent operation. Cross-linking leads to insoluble resins or derivatives thereof. With this rationale understood, it is obvious that trifunctional phenols are tolerable only in a minor proportion and should not be present to the extent that insolubility is produced in the resins, or that the product resulting from oxyalkylation is gelatinous or rubbery.

Previous reference has been made to the fact that fusible organic solvent-soluble resins are usually linear but may be cyclic. Such more complicated structure may be formed, particularly if a resin prepared in the usual manner is converted into a higher stage resin by heat treatment in vacuum, as previously mentioned. This again is a reason for avoiding any opportunity for cross-linking due to the presence of any appreciable amount of trifunctional phenol. In other words, the presence of such reactant may cause cross-linking in a conventional resinification procedure, or in the oxyalkylation procedure, in the heat and vacuum treatment, or in some processing or reaction to which the finished intermediate is subsequently subjected.

Our routine procedure in examining a phenol for suitability for preparing products of the invention is to prepare a resin employing formaldehyde in excess (1.2 moles of formaldehyde per mole of phenol) and using an oxalic acid catalyst, in the manner described hereinafter in Example 1a. If the resin so obtained is solvent-soluble in any one of the aromatic or other solvents previously referred to, it is then subjected to oxyethylation. During oxyethylation a temperature is employed of approximately 150° to 165° C., with addition of at least ½ and less than 2 moles of ethylene oxide per phenolic hydroxyl. The oxyethylation is advantageously conducted so as to require from a few minutes up to 5 to 10 hours. If the product so obtained is solvent-soluble, the phenol is satisfactory from the standpoint of trifunctional phenol content. When a product becomes rubbery during oxyalkylation, due to the presence of a small amount of trireactive phenol, as previously mentioned, or for some other reason, it may become extremely insoluble, and no longer qualifies as being useful. Increasing the size of the aldehydic nucleus, for instance, using heptaldehyde instead of formaldehyde, increases tolerance for trifunctional phenol.

The presence of a trifunctional or tetrafunctional phenol (such as resorcinol or bisphenol A) is apt to produce detectable cross-linking and insolubilization, but will not necessarily do so, especially if the proportion is small. Resinification involving difunctional phenols only may also produce insolubilization, although this seems to be an anomaly or a contradiction of what is sometimes said in regard to resinification reactions involving difunctional phenols only. This is presumably due to cross-linking. This appears to be contradictory to what one might expect in light of the theory of functionality in resinification. However, under ordinary circumstances, i. e., under the circumstances of conventional resin manufacture, the procedures employing difunctional phenols are very apt to, and almost invariably do, yield solvent-soluble, fusible resins.

In this connection it may be well to point out that part of these reactions are now understood or explainable to a greater or lesser degree in light of a most recent investigation. Reference is made to the researches of Zinke and his co-workers, Bultzsch and his associates, and to Von Eulen and his co-workers, and others. As to a bibliography of such investigations, see Carswell "Phenoplasts," chapter 2. These investigators limited much of their work to reactions involving phenols having two or less reactive hydrogen atoms. Much of what appears in these most recent and most up-to-date investigations is pertinent to the present invention insofar that much of it is referring to resinification involving difunctional phenols.

The "typical type" of fusible resin obtained from a para-blocked or ortho-blocked phenol is clearly differentiated from the Novolak type or resole type resin. Unlike the resole type, such "typical type" para-blocked or ortho-blocked phenol resin may be heated indefinitely without passing into an infusible stage, and in this respect is similar to a Novolak. Unlike the Novolak type, the addition of a further reactant, for instance, more aldehyde, does not ordinarily alter fusibility of the difunctional phenolaldehyde type resin; but such addition to a Novolak causes cross-linking by virtue of the available third functional position.

What has been said immediately preceding is subject to a modification in this respect: It is well known, for example, that difunctional phenols, for instance, paratertiaryamylphenol, and an aldehyde, particularly formaldehyde, may yield heat-hardenable resins, at least under certain conditions, as, for example, the use of two moles of formaldehyde to one of phenol, along with an alkaline catalyst. This peculiar hardening or curing or cross-linking of resins obtained from difunctional phenols has been recognized by various authorities.

In its simplest presentation, the rationale of resinification involving formaldehyde, for example, and a difunctional phenol would not be expected to form cross-links. However, cross-linking sometimes occurs and may reach the objectionable stage. Nevertheless, provided that the preparation of resins simply takes into cognizance the present knowledge of the subject, and employing preliminary, exploratory routine examinations, as herein indicated, there is not the slightest difficulty in preparing a very large number of resins of various types and from various reactants, and by means of different catalysts by different procedures, all of which are eminently suitable for the herein described purpose.

Now returning to the thought that cross-linking can take place, even when difunctional phenols are used exclusively, attention is directed to the following: Somewhere during the course of resin manufacture there may be a potential cross-linking combination formed but actual cross-linking may not take place until the subsequent stage is reached, i. e., heat and vacuum stage, or oxyalkylation stage. This situation may be related or explained in terms of a theory of flaws, or Lockerstellen, which is employed in explaining flaw-forming groups, due to the fact that a CH:OH radical and H atom may not lie in the same plane in the manufacture of ordinary phenol-aldehyde resins.

Secondly, the formation or absence of formation of insolubles may be related to the aldehyde used and the ratio of aldehyde, particularly formaldehyde, insofar that a slight variation may, under circumstances not understandable, produce insolubilization. The formation of the insoluble resin is apparently very sensitive to the quantity of formaldehyde employed and a slight increase in the proportion of formaldehyde may lead to the formation of insoluble gel lumps. The cause of insoluble resin formation is not clear, and nothing is known as to the structure of these resins.

All that has been said previously herein as regards resinification has avoided specific reference to activity of a methylene hydrogen atom. Actually there is a possibility that under some drastic conditions cross-linking may take place through formaldehyde addition to the methylene bridge, or some other reaction involving a methylene hydrogen atom.

Finally, there is some evidence that, although the meta positions are not ordinarily reactive, possibly at times methylol groups or the like are formed at the meta positions; and if this were the case it may be a suitable explanation of abnormal cross-linking.

Reactivity of a resin towards excess aldehyde, for instance, formaldehyde, is not to be taken as a criterion of rejection for use as a reactant. In other words, a phenol-aldehyde resin which is thermoplastic and solvent-soluble, particularly if xylene-soluble, is perfectly satisfactory, even though retreatment with more aldehyde may change its characteristics markedly in regard to both fusibility and solubility. Stated another way, as far as resins obtained from difunctional phenols are concerned, they may be either formaldehyde-resistant or not formaldehyde-resistant.

Referring again to the resins herein used as reactants, it is to be noted that they are thermoplastic phenol-aldehyde resins derived from difunctional phenols and are clearly distinguished from Novolaks or resoles.

When these resins are produced from difunctional phenols and some of the higher aliphatic aldehydes, such as acetaldehyde, the resultant is often a comparatively soft resin.

Reference has been made to the use of the word "fusible." Ordinarily, a thermoplastic resin is identified as one which can be heated repeatedly and still not lose its thermoplasticity. It is recognized, however, that one may have a resin which is initially thermoplastic, but on repeated heating, may become insoluble in an organic solvent, or at least no longer thermoplastic, due to the fact that certain changes take place very slowly. As far as the present invention is concerned, it is obvious that a resin, to be suitable, need only be sufficiently fusible to permit processing to produce our oxyalkylated products and not yield insolubles or cause insolubilization or gel formation, or rubberiness, as previously described. Thus resins which are, strictly speaking, fusible but not necessarily thermoplastic in the most rigid sense that such terminology would be applied to the mechanical properties of a resin, are useful reactants. The bulk of all fusible resins of the kind herein described are thermoplastic.

The fusible or thermoplastic resins, or solvent-soluble resins, herein employed as reactants, are water-insoluble, or have no appreciable hydrophile properties. In the hereto appended claims and elsewhere the expression "water-soluble" is used to point out this characteristic of the resins used.

The oxyalkylated resins which constitute the products of the present invention are valuable as intermediates in the production of various materials which are themselves useful in widely different applications, as described hereinafter.

The preparation of the new products of the invention will be illustrated by the following specific examples, but the invention is not limited thereto. For convenience, the examples have been divided into two groups: Examples 1a to 118a, illustrating the preparation of suitable parent resins; and Examples 1b to 5b, and the table, the preparation of suitable oxyalkylated derivatives thereof.

Where color is important in the materials prepared from the intermediates which are the new compositions of the invention, due precautions should be taken to avoid darkening. Thus, for the production of light-colored products, all reactions should be carried out in equipment which does not tend to cause darkening, such as glass, enamel-lined, stainless steel, or other suitable equipment, with suitable precautions to exclude oxygen, for example, by blanketing the reaction mixtures with an inert gas, such as carbon dioxide, or nitrogen, or solvent vapor. Such precautions are those commonly used in the preparation of varnishes and products of that nature. Of course, for certain uses it is unnecessary that the compositions have a light color.

Example 1a

|  | Grams |
|---|---|
| Tertiary butyl phenol (7 moles) | 1050 |
| Formaldehyde (37½%)—(6.5 moles) | 525 |
| Oxalic acid | 5 |
| Wetting agent (Aerosol O. T.) 100% | 2 |

Place all the materials in a 5-liter three-necked glass flask fitted with an efficient glass stirrer, thermometer, and reflux condenser. Agitate continuously. Heat to 185° to 190° F. in 30 minutes. At this point an exothermic reaction may raise the temperature. Heat to 205° to 210° F. and hold for appearance of a thick, creamy mass, which will take place in about 45 minutes. Set the apparatus for distillation, and heat to 300° F. At about 260° to 275° F. an exothermic reaction will be observed. Hold the temperature at 290° to 300° F. until the resin has a melting point of about 235° F. on Parr melting point bar (Parr Instrument Co., Moline, Illinois). The yield of pale resin is 1100 to 1115 grams. The ball and ring melting point is about 275° F.

Example 2a

|  | Grams |
|---|---|
| Tertiary butyl phenol | 1050 |
| Hydrochloric acid (32%) | 4 |
| Formaldehyde (37½%) | 525 |
| Aerosol O. T. (100%) | 2 |

The procedure followed is that of Example 1. After 10 minutes at 300° F. the resin has a melting point of 284° F. (ball and ring). Yield 1108 parts. The reaction is fast.

Example 3a

|  | Grams |
|---|---|
| Crude octyl phenol (73–76% octyl phenol content)[1] | 1670 |
| Oxalic acid | 8 |
| Formaldehyde (37½%) | 450 |
| Aerosol O. T. | 2 |

[1] Contains traces of phenol, mineral spirits B. P. 90° to 135° C. and water.

The procedure of Example 1 is varied as follows: Heat to 184° C. Attain 200° F. in 30 minutes and hold for 1½ to 2 hours. Distill to attain 280° F. in about 1½ hours. Distill slowly to attain 300° to 310° F. Hold until bar melting point is about 160° to 154° F. to attain ball and ring melting point of 190° to 205° F. Yield is 1400 parts.

Example 4a 100 parts of para-hydroxydiphenyl and 100 parts of commercial formaldehyde, with 0.7 gram oxalic acid as a condensing agent, are heated in a closed container under pressure to a temperature of about 120° C. until the condensation is substantially complete. The water is then removed by heating at reduced pressure. The product obtained by this procedure is a hard, clear, light-colored resinous material, melting at about 150° C. or higher and is readily soluble in tung oil and other fatty oils.

Ortho-hydroxydiphenyl can be substituted for the para-hydroxydiphenyl to yield a hard, clear, light-amber-colored material which melts at about 80° C., or the two can be mixed in varying proportions to give resinous products having any desired melting point ranging from about 80° to about 150° C.

Example 5a 100 parts of para-hydroxy-diphenyl, 100 parts acetaldehyde and 1 part commercial hydrochloric acid are refluxed together. The mass is dehydrated to yield an oil-soluble product.

Example 6a 147 parts of purified para-tertiary butyl phenol and 118 parts of 37.5% formaldehyde solution are reacted in the presence of 4 parts of oxalic acid for about 70 minutes at about 92–94° C. The mass is dehydrated to a boiling temperature in the resin of about 165° C., yielding a water-white resin.

Example 7a 100 parts of para-methyl-cyclo-hexyl phenol and 48.4 parts of formaldehyde are refluxed together in the presence of 1.93 parts of oxalic acid for about 7 hours and dehydrated to a temperature of 120° C. A water-white non-heat-hardening resin is obtained melting at about 287° C.

Example 8a 100 parts of octyl phenol is refluxed with 43.2 parts of formaldehyde and 1.73 parts of oxalic acid. The resin separates in about 12 hours, and it is dehydrated to 165° C. The resin obtained is soft, and, upon heating to 210° C., becomes brittle and about water-white in color; it melts at about 163° F.

Example 9a 100 parts of para-benzyl phenol is refluxed 8 hours with 48.4 parts of formaldehyde and 1.93 parts of oxalic acid. A brittle solid resin with a melting point of about 142° F. is obtained.

Example 10a

Charge 1148 grams of p-tertiary amylphenol, 525 grams of 37.2% formalin, 5 grams of oxalic acid, and 2 grams of Aerosol O. T. into a three-necked glass flask equipped with thermometer, mechanical glass stirrer and reflux condenser. Reflux the mixture with stirring for 1.5 hours at 93–97° C.; then dehydrate by distillation at 110–150° C. for 4.3 hours. About 454 grams of water are removed. The yield of hard, brittle, reddish-yellow resin in one case was 1218 grams. Its melting point was 116–123° C.

Example 11a

| | Pounds |
|---|---|
| Para-tertiary butylphenol | 36.0 |
| Formaldehyde 36.9% | 18.1 |
| Xylene | 38.9 |
| Oxalic acid | 0.2 |
| Dioctyl ester of sodium sulfosuccinic acid | 0.06 |

All of the phenol, formaldehyde, oxalic acid, and wetting agent, with 14.4 lbs. of the xylene were placed in a 15 gallon conventional stainless steel resin kettle. The mixture was refluxed at 92° C. for 80 minutes. 14.4 lbs. of xylene were added, and the material dehydrated by distillation at 92°–149° C. for 2.75 hours. The resin was cooled, and a stream of nitrogen gas introduced concurrently. The remainder of the xylene was added. The product, 76.25 lbs. of pale tan slurry, contained 49.7% of solid resin, of melting point 124–132° C., on a copper block. A total of 15.25 lbs. of water was removed.

Example 12a

| | Grams |
|---|---|
| Para-tertiary butylphenol (1.0 mole) | 150 |
| Formaldehyde 37% (1.0 mole) | 81 |
| Oxalic acid | 0.7 |
| Monoalkyl ($C_{10}$–$C_{20}$, principally $C_{12}$–$C_{14}$) benzene monosulfonic acid sodium salt | 0.8 |
| Xylene | 100 |

Examples of alkaryl sulfonic acids which serve as catalysts and as emulsifiers particularly in the form of sodium salts include the following:

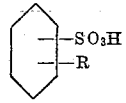

R is an alkyl hydocarbon radical having 12–14 carbon atoms.

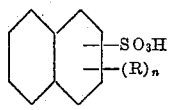

R is an alkyl radical having 3–12 carbon atoms and $n$ represents the numeral 3, 2, or 1, usually 2, in such instances where R contains less than 8 carbon atoms.

(With respect to alkaryl sulfonic acids or the sodium salts, we have employed a monoalkylated benzene monosulfonic acid or the sodium salt thereof wherein the alkyl group contains 10 to 14 carbon atoms. We have found equally effective and interchangeable the following specific sulfonic acids or their sodium salts: A mixture of di- and tripropylated naphthalene monosulfonic acid; diamylated naphthalene monosulfonic acid; and nonyl naphthalene monosulfonic acid.)

The procedure followed was that of Example 1a. The phenol was a flaked solid.

The resin obtained in the operation above described was clear, light-colored, hard, brittle, and had a melting point of 160–165° C.

Example 13a

The same procedure was followed as in the preceding example, and the materials used the same, except that the para-tertiary butylphenol was replaced by an equal amount of para-secondary butylphenol. The phenol was a solid of a somewhat mushy appearance, resembling moist cornmeal, rather than dry flakes. The appearance of the resin was substantially identical with that of the preceding example.

Example 14a

| | Grams |
|---|---|
| Para-tertiary amylphenol (1.0 mole) | 164 |
| Formaldehyde 37% (1.0 mole) | 81 |
| Oxalic acid | 0.7 |
| Monoalkyl ($C_{10}$–$C_{20}$, principally $C_{12}$–$C_{14}$) benzene monosulfonic acid sodium salt | 0.8 |
| Xylene | 100 |

The procedure followed was the same as that used in Example 1a, preceding. The phenol employed was a flaked solid. The solvent-free resin was light in color, hard, brittle, with a melting point of 128–140° C. It was xylene-soluble.

Example 15a

The phenol employed (164 grams) was para-secondary amylphenol, which is a liquid, the other ingredients being the same as in the preceding example. The procedure followed was the same as that used in Example 1a, preceding. The solvent-free resin was hard and brittle, light in color and with a melting point of 80–85° C.

Example 16a

The phenol employed (164 grams) was a commercially available mixed amylphenol containing approximately 95 parts of para-tertiary amylphenol, and 5 parts of ortho-tertiary amylphenol. It was in the form of a fused solid. The other ingredients and the procedure employed were the same as those of Example 12a, preceding. The appearance of the resin was substantially the same as that of the product of Example 14a.

Sometimes resins produced from para-tertiary amylphenol and formaldehyde in the presence of an acid catalyst show a slight insolubility in xylene; that is, while completely soluble in hot xylene to give a clear solution, they give a turbid solution in cold xylene. Such turbidity or lack of solubility disappears on heating, or on the addition of diethylethyleneglycol.

We have never noticed this characteristic property when using the commercial phenol of Example 16a, which, as stated, is a mixture containing 95% para-tertiary amylphenol and 5% ortho-tertiary amylphenol. In fact, the addition of 5% to 8% of an ortho-substituted phenol, such as ortho-tertiary amylphenol, to any difunctional para-substituted phenol, such as the conventional para-substituted phenols herein mentioned, usually gives an increase in solubility when the resulting resin is high melting, which is often the case when formaldehyde and an acid catalyst are employed.

Example 17a

The phenol employed (164 grams) was ortho-tertiary amyl-phenol which is a liquid. The other ingredients and the procedure followed were the same as those used in Example 12a, and the appearance of the resin was light amber in color and transparent. It was soft to pliable in consistency and xylene-soluble.

Example 18a

The phenol employed (178 grams) was para-tertiary hexylphenol. This is a solid at ordinary temperatures. The other ingredients and the procedure followed were the same as those used in Example 12a, preceding, and the appearance of the resin was substantially the same as that of the resin of Example 14a. The solvent-free resin is slightly opaque in appearance, light amber in color, semi-hard to pliable in consistency, and xylene-soluble.

Example 19a

The phenol employed was commercial para-octylphenol. 206 grams of this phenol were employed instead of 164 grams of an amylphenol or 150 grams of a butylphenol and 150 grams of xylene were used instead of 100. Otherwise, the procedure and other ingredients were the same as those used in Example 12a. The solvent-free resin obtained was light amber in color, soft to pliable in consistency, and xylene-soluble.

Example 20a

| | Grams |
|---|---|
| Para-phenylphenol | 170 |
| Formaldeheyde, 37% | 81 |
| HCl (Concentrated) | 1.5 |
| Monoalkyl ($C_{10}$–$C_{20}$, principally $C_{12}$–$C_{14}$) benzene monosulfonic acid sodium salt | 0.8 |
| Xylene | 150 |
| Diethyleneglycol diethylether | 50 |

This phenol was solid. The phenol, xylene, diethyleneglycol diethylether, and hydrochloric acid were mixed together and heated to give complete solution at approximately 140° C. The use of diethyleneglycol diethylether, or some equivalent solvent, was necessary, for the reason that this particular phenol is not sufficiently soluble in xylene. Having obtained a complete solution in the manner indicated, it was allowed to cool to approximately 75–80° C., and thereafter, formaldehyde was added and the procedure was the same as that used in Example 1a.

The final product contained not only xylene, but also diethyleneglycol diethylether. Since this latter does not distill out readily (boiling point 189° C.) we did not obtain a solvent-free resin sample, but used the product as such for oxyethylation. As pointed out elsewhere, the presence of a solvent is usually desirable in the oxyalkylation step. We have, however, examined a number of para-phenylphenolformaldehyde acid-catalyst resins which were hard, brittle resins, and melting in the neighborhood of 150° C. or thereabouts.

When ortho-hydroxydiphenyl is substituted for para-hydroxydiphenyl one can eliminate the diethyleneglycol diethylether and use the procedure described in Example 1a, without modification. Ortho-substituted phenols yield resins which have lower melting points than do the para-substituted phenols and are usually more xylene-soluble than resins obtained from the corresponding para-substituted phenols. The matter of the lower melting point is also illustrated in the case of para-tertiary amylphenol resins in comparison with ortho-tertiary amylphenol resins. The resin obtained from ortho derivative and formaldehyde melts at about 80° C. and upward, whereas, the comparable para derivative resin melts at about 160° C. In this instance, both resins are xylene-soluble.

Example 21a

The same procedure was employed as in Example 12a, except that para-cyclohexylphenol, 176 grams, was employed along with 150 grams of xylene. This phenol was solid. The resulting resin minus solvents was opaque in appearance, xylene-dispersible, amber in color, hard and brittle, with an approximate melting point of 170° C. It was sufficiently curable to prohibit distillation.

Example 22a

The same procedure was employed as in Example 12a, preceding, but using 198 grams of commercial styrylphenol and 150 grams of xylene. Styrylphenol is a white solid. The resin was light in color, hard and brittle, with a melting point of about 80° to 85° C.

Example 23a

| | Grams |
|---|---|
| Para-tertiary amylphenol (1.0 mole) | 164 |
| Formaldehyde 37% (0.8 mole) | 64.8 |
| Glyoxal 30% (0.1 mole) | 20.0 |
| Concentrated HCl | 2 |
| Monoalkyl ($C_{10}$–$C_{20}$, principally $C_{12}$–$C_{14}$) benzene monosulfonic acid sodium salt | 0.75 |
| Xylene | 150 |

This resin was prepared using the same equipment, and the same procedure as in Example 1a, preceding. The resin contained a slight amount of insoluble material which was removed by filtration of the xylene solution. This slight amount of insoluble material may have been the result of some very minor decomposition, due to the fact that the glyoxal was an aged sample. After removal of the small amount of insoluble material, the xylene was removed by distillation. The resultant resin was reddish amber in color, soft or liquid in consistency and xylene-soluble.

Example 24a

| | Grams |
|---|---|
| Para-tertiary amylphenol (1.0 mole) | 164 |
| Glyoxal 30.2% (0.5 mole) | 96 |
| Concentrated HCl | 2 |
| Monoalkyl ($C_{10}$–$C_{20}$, principally $C_{12}$–$C_{14}$) benzene monosulfonic acid sodium salt | 0.8 |
| Xylene | 150 |

The same procedure was followed as in Example 1a. There was a modest precipitate of an insoluble material, approximately 15 grams, which had an insoluble sponge-like carbonaceous appearance. It was removed by filtration, of the xylene solution as in the preceding example. The resulting solvent-free resin was clear, reddish amber in color, soft to fluid in consistency, and xylene-soluble.

Example 25a

| | Grams |
|---|---|
| Para-tertiary butylphenol (1.0 mole) | 150 |
| Acetaldehyde (1.0 mole) | 44 |
| Oxalic acid | 2 |
| Xylene | 100 |

The phenol, acid catalyst, and 50 grams of the xylene were combined in the resin pot previously described. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of a separatory funnel. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour and an hour and a half before removing the water by means of the trap arrangement. After the water was removed the remainder of the procedure was essentially the same as in Example 1a. When a sample of the resin was freed from the solvent, it was light in color, semi-hard or pliable in consistency, and xylene-soluble.

*Example 26a*

The same procedure was followed as in Example 25a, except that the para-tertiary butylphenol was replaced by an equal amount of para-secondary butylphenol. The appearance of the final resin on a solvent-free basis was substantially identical with the preceding example, except that it was somewhat more fluid in consistency and slightly tacky.

*Example 27a*

The same procedure was followed as in Example 25a, except that the 150 grams of para-tertiary butylphenol were replaced by 164 grams of para-tertiary amylphenol. The final solvent-free resin was clear and dark red in color. It was xylene-soluble and semi-hard or pliable in consistency.

*Example 28a*

The same procedure was followed as in Example 27a preceding, except that the para-tertiary amylphenol was replaced by an equal amount of para-secondary amylphenol. The appearance of the resin was substantially identical with that of the resin of the preceding example, except that it was somewhat more fluid in consistency and slightly tacky.

*Example 29a*

The same procedure was followed as in Example 27a, except that the amylphenol employed was the phenol described in Example 16a. The appearance of the resin on a solvent-free basis was substantially the same as that of Example 27a.

*Example 30a*

The same procedure was followed as in Example 27a, except that the amylphenol employed was ortho-tertiary amylphenol. The resin on a solvent-free basis was transparent and light-colored; it was soft to tacky in consistency and xylene-soluble.

*Example 31a*

The same procedure was followed as in Example 25a, except that the 150 grams of para-tertiary butylphenol were replaced by 206 grams of commercial para-octylphenol. The solvent-free resin was pale in color, soft to tacky in consistency, and xylene-soluble.

*Example 32a*

The same procedure was employed as in Example 25a, except that the 150 grams of para-tertiary butylphenol were replaced by 170 grams of para-phenylphenol. The resin produced was at least dispersible in xylene when hot, giving the appearance of solubility. When the solution cooled, obvious separation took place. For this reason 100 grams of diethyleneglycol diethylether were added to the finished resin mixture, when hot, so as to give a suitable solution when cold. A small sample was taken before adding the diethyleneglycol diethylether, and the xylene was evaporated in order to determine the character of the resin. The solvent-free resin was light in color. It was soft and pliable in consistency.

*Example 33a*

The same procedure was followed as in Example 25a, except that 176 grams of para-cyclohexylphenol were employed instead of the para-tertiary butylphenol. The solvent-free resin was clear, light in appearance, soft to pliable in consistency, and xylene-soluble.

*Example 34a*

The same procedure was followed as in Example 25a, except that the phenol employed was commercial styrylphenol and the amount employed was 198 grams. The resin was soft-to-pliable, light in color, and xylene-soluble.

*Example 35a*

| | Grams |
|---|---|
| Para-tertiary amylphenol (1.0 mole) | 164 |
| Heptaldehyde (1.0 mole) | 114 |
| Oxalic acid | 2 |
| Xylene | 100 |

The procedure employed was essentially the same as in the Example 25a, where acetaldehyde was employed, but with the difference that, due to the fact that the particular aldehyde was a higher-boiling aldehyde, it was not necessary to dilute it with the xylene. For this reason, all the xylene was added to the initial mixture, and the higher-boiling aldehyde was added by means of a separatory funnel. Thus, the phenol, acid catalyst, and solvent were combined in a resin pot by the same procedure used as in Example 25a. The resin, after removal of the solvent by distillation, was clear, amber in color, had a soft, tacky appearance and was xylene-soluble.

*Example 36a*

| | Grams |
|---|---|
| Para-secondary butylphenol (1.0 mole) | 150 |
| Heptaldehyde (1.0 mole) | 114 |
| Oxalic acid | 2 |
| Xylene | 100 |

The same procedure was employed as in Example 35a. The solvent-free resin had physical characteristics similar to those of the resin of Example 35a.

*Example 37a*

| | Grams |
|---|---|
| Para-tertiary butylphenol (1.0 mole) | 150 |
| Heptaldehyde (1.0 mole) | 114 |
| Oxalic acid | 2 |
| Xylene | 100 |

This resin was prepared as in Example 35a, preceding, with the resulting solvent-free resin being of a clear amber color, semi-hard or pliable, and xylene-soluble.

*Example 38a*

| | Grams |
|---|---|
| Para-phenylphenol (1.0 mole) | 170 |
| Heptaldehyde (1.0 mole) | 114 |
| Concentrated $H_2SO_4$ | 2 |
| Xylene | 100 |

The resin was prepared as in Example 35a. The solvent-free resin was slightly opaque, dark amber in color, soft to fluid, and sufficiently xylene-dispersible to permit subsequent oxyalkylation.

*Example 39a*

| | Grams |
|---|---|
| Para-cyclohexylphenol (3.0 moles) | 528 |
| Heptaldehyde (3.0 moles) | 342 |
| Oxalic acid | 6 |
| Xylene | 500 |

This resin, made as in Example 35a, in solvent-free form was clear, amber in color, semi-soft to pliable and xylene-soluble.

Example 40a

| | Grams |
|---|---|
| Para-tertiary amylphenol (1.0 mole) | 164 |
| Benzaldehyde (1.0 mole) | 106 |
| Oxalic acid | 2 |
| Xylene | 100 |

This resin, made as in Example 35a, in solvent-free form, was clear, hard, brittle, had a melting point of 160–165° C., and was xylene-soluble.

Example 41a

| | Grams |
|---|---|
| Para-secondary butylphenol (1.0 mole) | 150 |
| Benzaldehyde (1.0 mole) | 106 |
| Oxalic acid | 2 |
| Xylene | 100 |

This resin, made following the procedure employed in Example 35a, in solvent-free form was clear, light in color, semi-hard or pliable and xylene-soluble.

Example 42a

| | Grams |
|---|---|
| Para-tertiary butylphenol (1.5 moles) | 225 |
| Benzaldehyde (1.5 moles) | 159 |
| Oxalic acid | 3 |
| Xylene | 200 |

The above reactants were combined by the procedure of Example 35a. The solvent-free resin was a clear, hard, brittle, light amber-colored resin, which was xylene-soluble, and had a melting point of 180–185° C. It was to some degree heat-curable.

Example 43a

| | Grams |
|---|---|
| Para-phenylphenol (1.5 moles) | 255 |
| Benzaldehyde (1.5 moles) | 159 |
| Oxalic acid | 3 |
| Xylene | 200 |

This resin was made as in Example 35a. The resulting solvent-free resin was clear, light, hard, and brittle, with a melting point of 200–205° C. It was somewhat heat-curable, and almost completely soluble in xylene, with some insoluble material which was dispersible. It was suitable for subsequent oxyalkylation.

Example 44a

| | Grams |
|---|---|
| Para-cyclohexylphenol (3.0 moles) | 528 |
| Benzaldehyde (3.0 moles) | 318 |
| Oxalic acid | 6 |
| Xylene | 500 |

This resin, formed by combining the above reactants according to the procedure employed in Example 35a, was hard, brittle, xylene-soluble, light in color, and had a melting point of 165–170° C., with a tendency towards being heat-curable.

Example 45a

| | Grams |
|---|---|
| Para-tertiary amylphenol (1.0 mole) | 164 |
| Propionaldehyde 96% (1.0 mole) | 60.5 |
| Oxalic acid | 2 |
| Xylene | 150 |

The above reactants were combined according to the procedure followed in Example 35a. The resulting solvent-free resin was clear, light amber in color, soft to pliable, and xylene-soluble.

Example 46a

| | Grams |
|---|---|
| Para-secondary butylphenol | 150 |
| Propionaldehyde 96% | 60.5 |
| Oxalic acid | 2 |
| Xylene | 100 |

This resin was prepared according to the procedure employed in Example 35a. The resulting solvent-free resin was clear, soft to fluid, light amber in color, and was xylene-soluble.

Example 47a

| | Grams |
|---|---|
| Para-tertiary butylphenol (1.0 mole) | 150 |
| Propionaldehyde 96% (1.0 mole) | 60.6 |
| Oxalic acid | 2 |
| Xylene | 100 |

This resin was prepared according to the procedure employed in Example 35a. The resulting solvent-free resin was clear, amber in color, xylene-soluble, hard and brittle, and has a melting point of 80–85° C.

Example 48a

| | Grams |
|---|---|
| Para-phenylphenol (3.0 moles) | 510 |
| Propionaldehyde, 96% (3.0 moles) | 182 |
| Oxalic acid | 6 |
| Xylene | 500 |

The resulting resin, prepared according to the procedure of Example 35a, when solvent-free, was opaque, hard, relatively dark, and xylene-insoluble, but sufficiently dispersible in xylene for subsequent oxyalkylation. Addition of a minor proportion of ethyleneglycol diethylether completely solubilized the resin in xylene, a clear solution resulting.

Example 49a

| | Grams |
|---|---|
| Para-cyclohexylphenol (3.0 moles) | 528 |
| Propionaldehyde 96% (3.0 moles) | 182 |
| Concentrated $H_2SO_4$ | 6 |
| Xylene | 500 |

The resulting resin, prepared according to directions in Example 35a, when solvent-free was clear, dark amber in color, xylene-soluble, hard and brittle, and had a melting point of 84–90° C.

Example 50a

| | Grams |
|---|---|
| Para-tertiary amylphenol | 164 |
| 2-ethyl-3-propyl acrolein | 126 |
| Oxalic acid | 2 |
| Xylene | 100 |

The procedure employed was the same as for the use of heptaldehyde, as in Example 35a. The resulting solvent-free resin was amber in color, and soft to fluid in consistency. It was xylene-soluble.

Example 51a

| | Grams |
|---|---|
| Para-tertiary butylphenol | 150 |
| 2-ethyl-3-propyl acrolein | 126 |
| Oxalic acid | 2 |
| Xylene | 100 |

The procedure employed was the same as for the use of heptaldehyde, as in Example 35a. The appearance of the resin was the same as the resin of the Example 50a.

Example 52a

| | Grams |
|---|---|
| Commercial para-octylphenol | 206 |
| 2-ethyl-3-propyl acrolein | 126 |
| Oxalic acid | 2 |
| Xylene | 100 |

The procedure employed was the same as for the use of heptaldehyde, as in Example 35a. The appearance of the resin was the same as the resin of Example 50a.

Example 53a

| | Grams |
|---|---|
| Para-tertiary amylphenol | 164 |
| Furfural | 96 |
| Potassium carbonate | 8 |

The furfural was shaken with dry sodium carbonate prior to use, to eliminate any acids, etc. The procedure employed was substantially that described in detail in Technical Bulletin No. 109 of the Quaker Oats Company, Chicago, Illinois. The above reactants were heated under the reflux condenser for two hours in a resin pot. No xylene or other solvent was added. The amount of material vaporized and condensed was comparatively small except for the water of reaction. At the end of this heating or reflux period, the trap of the resin pot assembly was set to remove the water. The maximum temperature during and after removal of water was approximately 202° C. The material in the trap represented 16 cc. water and 1.5 cc. furfural. The resin was a bright black, hard resin, xylene-soluble, and had a melting point of 130° to 135° C., with some tendency towards being slowly curable. We have also successfully followed this same procedure using 3.2 grams of potassium carbonate instead of 8.0 grams.

Example 54a

| | Grams |
|---|---|
| Para-tertiary amylphenol | 164 |
| Furfural (carbonate treated) | 70 |
| Potassium carbonate | 3.2 |

The procedure employed was the same as that of Example 53a. The amount of water distilled was 10 cc. and the amount of furfural 3 cc. The resin was a bright black, xylene-soluble resin, semi-pliable to hard.

Example 55a

| | Grams |
|---|---|
| Para-tertiary amylphenol | 492 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 200 |

The above reactants were combined in a resin pot equipped with stirrer and reflux condenser. The reactants were heated with stirring under reflux for 2 hours at 100° to 110° C. The resinous mixture was then permitted to cool sufficiently to permit the addition of 15 ml. of glacial acetic acid in 150 cc. $H_2O$. On standing, a separation was effected, and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The resulting resin was clear, light amber in color, and semi-fluid or tacky in consistency.

Example 56a

| | Grams |
|---|---|
| Para-secondary butylphenol | 450 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 200 |

The same procedure was followed as in Example 55a. The resulting solvent-free resin was clear, light amber in color, and semi-fluid or tacky in consistency.

Example 57a

| | Grams |
|---|---|
| Para-phenylphenol | 510 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 500 |

The same procedure was employed as in Example 55a, except that the reaction product contained a considerable amount of a white crystalline solid which was alcohol-soluble and xylene-insoluble, necessitating the use of some isopropyl alcohol in effecting a separation. The resulting solvent-free resin had a grayish-white crystalline structure, and was hard, brittle, non-xylene-soluble but soluble in a xylene-diethyleneglycol diethylether mixture. This crystalline structure in phenylphenol resins has been noted in the literature.

Example 58a

| | Grams |
|---|---|
| Para-cyclohexylphenol | 528 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 300 |

This resin was made and worked up in the same manner as in Example 57a. The resin, after distillation and standing overnight, developed the same type of crystalline structure noted in the resin of the Example 57a. However, on cooling immediately after distillation, the resulting product was clear, light amber in color, and fairly soft in consistency.

Example 59a

| | Grams |
|---|---|
| Para-tertiary butylphenol | 450 |
| Formaldehyde, 30% | 652 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 300 |

The same procedure was followed as in Example 55a. The resulting resin was red in color, clear, and soft or semi-fluid in consistency.

Example 60a

This resin was prepared as in Example 55a, except that the para-tertiary amylphenol-formaldehyde ratio was 1 to 1.1 moles. The resulting solvent-free resin was red in color, clear, and semi-hard or pliable in consistency.

Example 61a

The resin was prepared as in Example 59a, except that the para-tertiary butylphenol-formaldehyde ratio was 1 to 1.1 moles. The resulting solvent-free resin was red in color, clear, hard, brittle, and had a melting point of 100–105° C.

Example 62a

| | |
|---|---|
| Commercial para-octyl phenol_____Gram__ | 412 |
| Formaldehyde, 30%_____do____ | 220 |
| NaOH in 20 cc. $H_2O$_____do____ | 4.5 |
| Monoalkyl ($C_{10}$–$C_{20}$, principally $C_{12}$–$C_{14}$) benzene monosulfonic acid sodium salt _____Gram__ | 1.5 |
| Xylene _____do____ | 300 |
| Glacial acetic acid_____Cubic Centimeters__ | 10 |

This resin was prepared as in Example 55a. A small amount, approximately 1%, of an insoluble, infusible flocculent precipitate was noted dispersed throughout the resinous solution. This was filtered out before distillation. The resin, after vacuum distillation to 150° C. to remove the solvent, was red in color, clear, hard and brittle, with a melting point of 113–170° C.

Example 63a

The resin of Example 55a was subjected to vacuum distillation to 225° C., at 25 mm. The resulting product was a hard, brittle resin, xylene-soluble, and having a melting point of 145–150° C.

Example 64a

The resin of Example 56a was subjected to vacuum distillation to 225° C., at 25 mm. The resulting product was hard, brittle, black in color, xylene-insoluble, and infusible up to 220° C. However, if the vacuum distillation was taken to only 175 or 180° C., at 25 mm. the resulting product was xylene-soluble and had a melting point of approximately 170° C.

Example 65a

The resin of Example 57a was subjected to vacuum distillation to 225° C., at 25 mm. The resulting product was opaque or crystalline, xylene-dispersible, and soluble in a mixed solvent of 75% xylene and 25% diethyleneglycol diethylether, with a melting point of 100–105° C.

Example 66a

The resin of Example 58a was subjected to vacuum distillation to 225° C., at 25 mm. The resulting product was opaque or crystalline, dark in color, xylene-soluble, and semi-hard or pliable in consistency.

Example 67a

The resin of Example 59a was subjected to vacuum distillation to 225° C., at 25 mm. The resulting product was hard, brittle, partially xylene-insoluble, but soluble in a mixed solvent of 75% xylene and 25% diethyleneglycol diethylether with an approximate melting point of 160–165° C. It was also heat-curable.

Example 68a

The resin of Example 60a was subjected to vacuum distillation to 225° C. at 25 mm. The resulting product was dark amber to black in color, xylene-soluble, hard and brittle, with a melting point of 145–150° C.

Example 69a

The resin of Example 61a was subjected to vacuum distillation to 225° C., at 25 mm. The resulting resin was black in color, hard and brittle, xylene-dispersible, and soluble in a mixed solvent of 75% xylene and 25% diethyleneglycol diethylether, with a melting point of 165–170° C. It was also heat-curable.

Example 70a

The resin of Example 62a was subjected to vacuum distillation to 225° C., at 25 mm. The resulting resin was dark amber in color, xylene-soluble, hard and brittle, with a melting point of 115–120° C.

Example 71a

| | Grams |
|---|---|
| Commercial para-tertiary amylphenol (described in Example 16a)_____ | 328 |
| Formaldehyde _____ | 352 |
| NaOH in 20 cc. $H_2O$_____ | 4.5 |
| Monoalkyl ($C_{10}$–$C_{20}$, principally $C_{12}$–$C_{14}$) benzene monosulfonic acid sodium salt__ | 1.5 |

The above reactants were refluxed with stirring for 2 hours. 200 grams of xylene were then added and the whole cooled to 90–100° C., and the NaOH neutralized with 10 cc. glacial acetic acid in 100 cc. $H_2O$. The mass was allowed to stand, effecting a separation. The lower aqueous layer was withdrawn and the upper resinous solution was washed with water. After drawing off the wash water, the xylene solution was subjected to vacuum distillation, heating to 150° C. The resulting solvent-free resin was xylene-soluble, soft or tacky in consistency, and pale yellow or light amber in color.

On heating further, without vacuum distillation, the following physical changes were noted:

Heated to 160° C.—Soft, tacky, pale yellow.
Heated to 190° C.—Hard, fairly brittle, pale yellow—low melting point.
Heated to 200° C.—Hard, fairly brittle, pale yellow—105–115° C. melting point.
Heated to 225° C.—Hard, brittle, amber— 120–125° C. melting point.
Heated to 250° C.—Hard, brittle, dark amber— 128–135° C. melting point.
Heated to 275° C.—Very brittle, deep brown— 155–160° C. melting point.

The above distillation was without the use of vacuum. It illustrates that heating alone, or heating with vacuum, changes a low-stage resin into a medium or high-stage resin.

Example 72a

This resin was obtained by the vacuum distillation of the resin of Example 14a. Vacuum distillation was conducted up to 250° C. at 25 mm. Hg. The resulting resin was hard, brittle, amber-colored, and had a slightly higher melting point than the resin prior to vacuum distillation, to wit, 140–145° C. It was xylene-soluble. The molecular weight, determined cryoscopically using benzene, was approximately 1400.

Example 73a

This resin was obtained by the vacuum distillation of the resin of Example 19a. Vacuum distillation was conducted up to 225° C. at 25 mm. The resulting resin was xylene-soluble, hard, brittle, reddish in color, with a melting point of 140–145° C. Note that this resin, prior to vacuum distillation, was soft to pliable in consistency.

Example 74a

This resin was obtained by the vacuum distillation of the resin of Example 21a. Vacuum distillation was conducted up to 225° C. at 25 mm. The resulting resin was xylene-dispersible, soluble in a mixture of xylene and diethyleneglycol diethylether, brown in color, and hard and brittle in nature. It had a melting point of 180–185°

C. This was moderately higher than the resin prior to vacuum distillation.

Example 75a

This resin was obtained by the vacuum distillation of the resin of Example 20a. Vacuum distillation was conducted up to 225° C. at 25 mm. The resulting resin was semi-hard but still contained some diethyleneglycol diethylether. Unquestionably, if completely separated from this solvent it would have been a hard solid resin. Such residual solvent was not eliminated lest there be danger of pyrolysis.

Example 76a

This resin was obtained by the vacuum distillation of the resin of Example 27a. Vacuum distillation was conducted up to 225° C. at 25 mm. The resulting resin had the same physical characteristics as the undistilled resin, except that it was slightly more viscous.

Example 77a

This resin was obtained by the vacuum distillation of the resin of Example 26a. Vacuum distillation was conducted up to 225° C. at 25 mm. The resulting resin was semi-hard to pliable.

Example 78a

This resin was obtained by the vacuum distillation of the resin of Example 31a. Vacuum distillation was conducted up to 225° C. at 25 mm. The resulting resin was hard to pliable.

In the immediately preceding examples describing the production of resins by the vacuum distillation of earlier examples, the vacuum used was approximately 25 mm. and the temperature was brought up to 225° C. Generally speaking, this is about the maximum temperature which is usable, and if the products obtained on distilling to this temperature, even if xylene-soluble, give insoluble or rubbery products on oxyethylation, the temperature used should be lower. We have found that using a temperature of 190° C. at 25 mm. gives very satisfactory compounds which have little tendency to form rubbery derivatives during oxyethylation.

Example 79a

| | Grams |
|---|---|
| Commercial para-tertiary amylphenol (described in Example 16a) | 164 |
| Formaldehyde | 81 |
| Monoalkyl (C$_{10}$–C$_{20}$, principally C$_{12}$–C$_{14}$) benzene monosulfonic acid sodium salt | .8 |
| Xylene | 200 |

No catalyst was added in this example. The reactants were placed in an autoclave and stirred while heating to a temperature of approximately 160° C. The total period of reaction was 5½ hours. During the early part of this period the temperature was 156° C. with a gauge pressure of 110 pounds.

During the last part of the period, probably due to the absorption of formaldehyde, the pressure dropped to 75 pounds gauge pressure while the temperature held at about 150° C. After this 5½ hour reaction period the autoclave was allowed to cool. The liquids were withdrawn and the xylene solution of the resin was decanted away from the small aqueous layer. The xylene solution, containing a bit of the aqueous layer carried over mechanically, was subjected to vacuum distillation up to 150° C. at 25 mm.

The resulting resin was fairly hard and brittle, xylene-soluble, amber in color, with a melting point of 55° to 66° C., and a molecular weight of 490. If desired, one may use considerably higher pressure so as to speed up the reaction and also in order to obtain resins of higher molecular weight. We have employed the same procedure with moderately higher temperatures and definitely higher pressures.

Example 80a

| | Grams |
|---|---|
| Menthyl phenol, technically pure (0.1 mole) | 232 |
| Formaldehyde, 37% (1.0 mole) | 81 |
| Oxalic acid | 0.7 |
| Monoalkyl (C$_{10}$–C$_{20}$, principally C$_{12}$–C$_{14}$) benzene monosulfonic acid sodium salt | 2 |
| Xylene | 200 |

The procedure followed was that of Example 1a. The resin obtained was clear, amber in color, hard, brittle and had a melting point of about 115–120° C.

Example 81a

| | Grams |
|---|---|
| Nonylphenol (para) 3.0 moles | 660 |
| Formaldehyde, 37% (3.0 moles) | 243 |
| Oxalic acid | 3.2 |
| Monoalkyl (C$_{10}$–C$_{20}$, principally C$_{12}$–C$_{14}$) benzene monosulfonic acid sodium salt | 2.5 |
| Xylene | 300 |

The procedure followed was the same as that used in Example 1a. The phenol employed was a heavy, sirupy liquid, largely or almost entirely para with possibly a small percentage of ortho present. The solvent-free resin was clear, light in color and semi-soft or pliable in consistency.

Example 82a

| | Grams |
|---|---|
| Octadecylphenol (1.0 mole) | 346 |
| Formaldehyde, 37% (1.0 mole) | 81 |
| Oxalic acid | 1.1 |
| Monoalkyl (C$_{10}$–C$_{20}$, principally C$_{12}$–C$_{14}$) benzene monosulfonic acid sodium salt | 1.6 |
| Xylene | 200 |

The procedure followed was the same as that used in Example 1a, preceding. The phenol employed was a liquid. It was largely or entirely the para isomer with possibly a small amount of ortho present. The resulting solvent-free resin was soft to pliable in consistency, clear and light amber in color.

Example 83a

| | Grams |
|---|---|
| Crude para-cumylphenol (1.27 moles) | 268 |
| Formaldehyde, 37% (2.0 moles) | 162 |
| Oxalic acid | 0.9 |
| Monoalkyl (C$_{10}$–C$_{20}$, principally C$_{12}$–C$_{14}$) benzene monosulfonic acid sodium salt | 1 |
| Xylene | 250 |

The so-called crude para-cumylphenol was a comparatively high grade product containing 90% to 95% of the phenol and the impurities present were hydrocarbons with less than ½% of phenol (hydroxy-benzene). The phenol was a yellowish colored solid, having a somewhat waxy appearance. The procedure followed was that of Example 1a. The resulting solvent-free resin was slightly opaque, amber in color and hard but not particularly brittle. It had a melting point of 80° to 85° C.

Example 84a

| | Grams |
|---|---|
| Para-decylphenol (1.0 mole) | 234 |
| Formaldehyde, 37% (1.0 mole) | 81 |
| Oxalic acid | 0.7 |
| Monoalkyl ($C_{10}$–$C_{20}$, principally $C_{12}$–$C_{14}$) benzene monosulfonic acid sodium salt | 1.2 |
| Xylene | 200 |

The procedure followed was the same as that used in Example 1a, preceding. The phenol was a straw-colored liquid having a little phenolic odor. The solvent-free resin obtained was light in color and semi-soft or pliable in consistency.

Example 85a

| | Grams |
|---|---|
| Para-dodecylphenol (1.0 mole) | 262 |
| Formaldehyde, 37% (1.0 mole) | 81 |
| Oxalic acid | 1.2 |
| Monoalkyl ($C_{10}$–$C_{20}$, principally $C_{12}$–$C_{14}$) benzene monosulfonic acid sodium salt | 2.5 |
| Xylene | 250 |

The procedure followed was the same as that used in Example 1a. The phenol was a straw-colored liquid having a little phenolic odor. The solvent-free resin obtained was light in color and semi-soft or pliable in consistency.

Example 86a

| | Grams |
|---|---|
| Nonylphenol (1.0 mole) | 220 |
| Formaldehyde, 37% (0.865 mole) | 70 |
| Glyoxal 30% (0.065 mole) | 12.5 |
| Concentrated HCl | 2 |
| Monoalkyl ($C_{10}$–$C_{20}$, principally $C_{12}$–$C_{14}$) benzene monosulfonic acid sodium salt | 0.8 |
| Xylene | 150 |

The procedure followed was the same as that used in Example 1a, preceding. When glyoxal is used it is not unusual for a very small amount of carbonaceous material to be formed. This was true in this case as the amount formed represented a few percent of the total amount of resin. This was removed by merely filtering the xylene solution. The solvent-free resin was clear in appearance, reddish amber in color and semi-hard to pliable in consistency.

Example 87a

| | Grams |
|---|---|
| Menthylphenol, technically pure (1.0 mole) | 232 |
| Acetaldehyde (1.0 mole) | 44 |
| Oxalic acid | 2 |
| Xylene | 100 |

The phenol, acid catalyst, and 50 grams of the xylene were combined in the reaction vessel. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of a separatory funnel. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 1a. The solvent-free resin was hard but not brittle, amber in color and had a melting point of about 50° to 55° C.

Example 88a

| | Grams |
|---|---|
| Nonylphenol, para (0.773 mole) | 170 |
| Acetaldehyde (0.773 mole) | 34 |
| Oxalic acid | 3 |
| Xylene | 75 |

The same procedure was followed as in Example 87a, except that nonylphenol was used instead of menthylphenol. The solvent-free resin was amber in color and soft to pliable in consistency.

Example 89a

| | Grams |
|---|---|
| Octadecylphenol (0.5 mole) | 173 |
| Acetaldehyde (0.5 mole) | 22 |
| Oxalic acid | 1 |
| Xylene | 75 |

The same procedure was followed as in Example 87a, except that octadecylphenol was used instead of menthylphenol. The solvent-free resin was soft to semi-brittle in consistency and reddish in color.

Example 90a

| | Grams |
|---|---|
| Menthylphenol (3.0 moles) | 696 |
| Heptaldehyde (3.0 moles) | 343 |
| Oxalic acid | 6 |
| Xylene | 500 |

The procedure employed was essentially the same as in Example 82a, where acetaldehyde was employed, but with the difference that, due to the fact that heptaldehyde is a higher boiling aldehyde, it was not necessary to dilute it with the xylene. For this reason all the xylene was added to the initial mixture, and the heptaldehyde was added by means of a separatory funnel. Thus, the phenol, acid catalyst, and solvent were combined in a resin pot by the same procedure used in Example 87a. The resin, after removal of the solvent by distillation, was clear, light in color, had a soft, tacky appearance and was xylene-soluble.

Example 91a

| | Grams |
|---|---|
| Nonylphenol (1.0 mole) | 220 |
| Heptaldehyde (1.0 mole) | 114 |
| Oxalic acid | 2 |
| Xylene | 150 |

The same procedure was followed as in Example 90a, preceding. The solvent-free resin was dark amber in color and semi-fluid or tacky in consistency.

Example 92a

| | Grams |
|---|---|
| Menthylphenol (1.0 mole) | 232 |
| Benzaldehyde (1.0 mole) | 106 |
| Oxalic acid | 2 |
| Xylene | 150 |

The procedure followed was the same as in Example 90a. The solvent-free resin was semi-hard to pliable and light amber in color.

Example 93a

| | Grams |
|---|---|
| Nonylphenol (1.5 moles) | 330 |
| Benzaldehyde (1.5 moles) | 159 |
| Oxalic acid | 3 |
| Xylene | 200 |

The procedure followed was the same as in Example 90a. The solvent-free resin was clear, semi-soft to pliable and amber in color.

Example 94a

| | Grams |
|---|---|
| Menthylphenol (1.0 mole) | 232 |
| Propionaldehyde, 96% (1.0 mole) | 60.5 |
| Oxalic acid | 2 |
| Xylene | 150 |

The same procedure was followed as in Example 90a. The solvent-free resin was amber in color, semi-hard or pliable in consistency, with a tendency toward tackiness.

Example 95a

| | Grams |
|---|---|
| Nonylphenol | 220 |
| Propionaldehyde, 96% (1.0 mole) | 60.5 |
| Oxalic acid | 2 |
| Xylene | 150 |

The same procedure was followed as in Example 90a. The solvent-free resin was amber in color and semi-fluid or tacky in consistency.

Example 96a

| | Grams |
|---|---|
| Nonylphenol (1.0 mole) | 220 |
| 2-ethyl-3-propyl acrolein (1.0 mole) | 126 |
| Oxalic acid | 2.5 |
| Xylene | 100 |

The same procedure was followed as in Example 90a. The solvent-free resin was dark in color and soft to fluid in consistency.

Example 97a

| | Grams |
|---|---|
| Menthylphenol (1.0 mole) | 232 |
| 2-ethyl-3-propyl acrolein (1.0 mole) | 126 |
| Oxalic acid | 2.5 |
| Xylene | 150 |

The same procedure was followed as in Example 90a. The solvent-free resin was dark in color and soft to fluid in consistency.

Example 98a

| | Grams |
|---|---|
| Menthylphenol (2.0 moles) | 464 |
| Formaldehyde, 37% (5.0 moles) | 405 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 300 |

The above reactants were combined in a resin pot equipped with stirrer and reflux condenser. The reactants were heated with stirring under reflux for 2 hours at 100° to 110° C. The resinous mixture was then permitted to cool sufficiently to permit the addition of 15 ml. of glacial acetic acid in 150 cc. $H_2O$. On standing, a separation was effected and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The solvent-free resin was light amber in color, non-brittle, and semi-pliable to hard.

Example 99a

| | | |
|---|---|---|
| Nonylphenol (3.0 moles) | grams | 660 |
| Formaldehyde, 30% (6.6 moles) | do | 652 |
| NaOH in 30 cc. $H_2O$ | do | 6.8 |
| Monoalkyl ($C_{10}$–$C_{20}$; principally $C_{12}$–$C_{14}$) benzene monosulfonic acid sodium salt | grams | 2 |
| Xylene | do | 300 |
| Glacial acetic acid | milliliters | 15 |

The procedure used was the same as that of Example 98a. The solvent-free resin was clear, dark amber in color and soft to fluid in consistency.

Example 100a

| | | |
|---|---|---|
| Nonylphenol (3.0 moles) | grams | 660 |
| Formaldehyde, 30% (3.3 moles) | do | 330 |
| NaOH in 30 cc. $H_2O$ | do | 6.8 |
| Monoalkyl ($C_{10}$–$C_{20}$; principally $C_{12}$–$C_{14}$) benzene monosulfonic acid sodium salt | grams | 2 |
| Xylene | do | 100 |
| Glacial acetic acid | milliliters | 15 |

The same procedure was followed as in Example 98a. The solvent-free resin was clear, pale in color and semifluid or tacky in consistency.

Example 101a

| | Grams |
|---|---|
| Nonylphenol (1.0 mole) | 220 |
| Furfural ($Na_2CO_3$ treated) (1.0 mole) | 96 |
| Potassium carbonate | 12 |
| Xylene | 200 |

The furfural was shaken with dry sodium carbonate prior to use to eliminate any acids, etc. The procedure employed was substantially that described in detail in Technical Bulletin No. 109 of the Quaker Oats Company, Chicago, Illinois. The materials, except the xylene, were heated under the reflux condenser for two hours, in the same resin pot arrangement described in Example 1a. At the end of this heating or reflux period the trap was set to remove the water, and the xylene added after most of the water had distilled. The maximum temperature during and after removal of water was approximately 205° C. The resin was a reddish black, clear resin, xylene-soluble, and semi-soft to pliable in consistency.

Example 102a

| | Grams |
|---|---|
| Menthylphenol (1.0 mole) | 232 |
| Furfural ($Na_2CO_3$ treated) (1.0 mole) | 96 |
| Potassium carbonate | 12 |
| Xylene | 200 |

The procedure followed was identical with that in Example 101a. The solvent-free resin was reddish black in color, hard, brittle, with a melting point of 158° to 163° C., and showed a definite tendency toward being heat-curable.

Example 103a

A duplication of the resin described under the heading of Example 99a was prepared and subjected to distillation. Distillation without vacuum was first employed to eliminate the xylene. After the elimination of xylene the resin was subjected to vacuum distillation to 225° C., at 25 mm. Hg. The resulting resin was dark in color, semifluid but of distinctly greater viscosity or hardness than the undistilled resin, and was still perfectly xylene-soluble.

Example 104a

A duplicate sample of the resin described under the heading of Example 100a was prepared and subjected to vacuum distillation, in the same manner as described in Example 103a preceding. The resin obtained by the vacuum distillation was dark in color, had a melting point of 100° to 105° C., and was xylene-soluble.

Example 105a

A duplicate of the resin described in Example 80a was prepared and subjected to vacuum distillation in the same manner as described in Example 103a. The resulting resin was a hard, brittle, amber-colored resin, xylene-soluble and had a melting point of 145° to 150° C.

Example 106a

A duplicate of the resin described in Example 81a was prepared and subjected to distillation, including vacuum distillation, in the same manner as described in Example 103a. The resulting resin was a clear, hard, brittle, xylene-soluble resin, amber-colored, and had a melting point of 80° to 85° C.

Example 107a

A duplicate of the resin described in Example 98a was prepared and subjected to distillation, including vacuum distillation, in the same manner as described in Example 103a. The resulting product was hard and brittle, with a melting point of 135° to 140° C. Otherwise, the physical characteristics were approximately the same as in the non-distilled product.

Example 108a

| | Grams |
|---|---|
| Nonylphenol (31 moles) | 6,820 |
| Formaldehyde, 37% (42 moles) | 3,430 |
| NaOH (in 200 cc. H$_2$O) | 93 |
| Xylene | 2,040 |

The above reactants were combined in a 5-gallon autoclave and heated with stirring in the following manner:

| Time | Temperature °C. | Pounds per Square Inch |
|---|---|---|
| 10:30 a. m. | 25 | 0 |
| 11:00 a. m. | 100 | 15 |
| 11:30 a. m. | 127 | 40 |
| 12:00 noon | 148 | 60 |
| 1:00 p. m. | 177 | 130 |
| 1:30 p. m. | 185 | 160 |
| 2:00 p. m. | 194 | 185 |

The reaction was stopped at this point, sufficient cooling water was applied to lower the temperature to approximately 80° C., or cool enough to permit opening the autoclave and adding 202 grams of glacial acetic acid to neutralize the NaOH.

The product was then removed from the autoclave and the resin solution diluted further so as to effect a ready separation of the aqueous layer. After twice washing with water to remove the excess formaldehyde, acetic acid and formed salt, the resin was subjected to vacuum distillation to 149° C. at 25 mm. Hg vacuum. The resulting resin was dark in color, xylene-soluble, hard but not brittle, and had a melting point of 85° to 90° C.

Example 109a

| | Grams |
|---|---|
| Nonylphenol (22.5 moles) | 4980 |
| Formaldehyde (37%, 25.5 moles) | 2076 |
| Monoalkyl (C$_{10}$–C$_{20}$, principally C$_{12}$–C$_{14}$) benzene monosulfonic acid sodium salt | 15 |
| NaOH (in 200 cc. H$_2$O) | 67 |
| Xylene | 4000 |

The above reactants were combined in a 5-gallon autoclave and heated with stirring, under pressure. The reactants were heated for 1¾ hours after temperature had reached 110 degrees C. The maximum temperature was 190° C. and the maximum pressure was 245 pounds per square inch.

After cooling, more than sufficient (148 grams) glacial acetic acid was added to neutralize the alkaline catalyst. The resin mixture was diluted, washed and distilled in a manner similar to that in the Example 108a. The resulting solvent-free resin, after vacuum (25 mm.) distillation to 150° C., was semi-hard to pliable, amber-colored, and xylene-soluble. If the vacuum distillation is further carried to 200° C., the resulting product is a hard, brittle resin with a melting point of 90° to 95° C. It is amber in color and xylene-soluble.

Example 110a

| | Grams |
|---|---|
| Nonylphenol (34 moles) | 7470 |
| Formaldehyde, 37% (38 moles) | 3114 |
| Xylene | 2020 |
| Catalyst | None |

The above reactants were combined in a 5-gallon autoclave. They were heated with stirring under pressure for a total heating time (time starting when temperature reached 100° C.) of 5 hours with a maximum temperature of 200° C., and maximum gauge pressure of 235 pounds per square inch.

After removing the resin mixture from the autoclave, it was diluted further with approximately 7000 grams of xylene. This was done to thin the resin sufficiently to permit a ready separation of the water and unreacted formaldehyde. After twice washing the xylene resin solution with water to assure the removal of any unreacted formaldehyde, the solution was subjected to vacuum distillation (25 mm.) to 145° C., to remove the xylene.

The resulting resin was clear, xylene-soluble, amber colored and semi-hard or pliable in consistency.

Example 111a

| | Grams |
|---|---|
| Decylphenol | 158 |
| Formaldehyde (37%) | 54.6 |
| Concentrated HCl | 2 |
| Monoalkyl (C$_{10}$–C$_{20}$, principally C$_{12}$–C$_{14}$) benzene monosulfonic acid sodium salt | 1 |
| Xylene | 150 |

The procedure followed was that of Example 1a. The solvent-free resin was clear, light amber in color, xylene-soluble and hard and brittle in consistency. It had a melting point of 110° to 115° C.

Example 112a

| | Grams |
|---|---|
| Dodecylphenol | 262 |
| Formaldehyde (37%) | 90 |
| Concentrated HCl | 3 |
| Monoalkyl (C$_{10}$–C$_{20}$, principally C$_{12}$–C$_{14}$) benzene monosulfonic acid sodium salt | 1 |
| Xylene | 100 |

Example 113a

| | |
|---|---|
| Dodecylphenol (1.0 mole) _____grams__ | 262 |
| Formaldehyde, 37% (1.1 moles) _____do____ | 90 |
| NaOH in 30 cc. H$_2$O_____do____ | 4.5 |
| Monoalkyl (C$_{10}$-C$_{20}$, principally C$_{12}$-C$_{14}$) benzene monosulfonic acid sodium salt grams__ | 1.0 |
| Xylene _____do____ | 200 |
| Glacial acetic acid_____milliliters__ | 10 |

The procedure followed was that of Example 98a. The solvent-free resin was clear, reddish-amber in color, xylene-soluble, and soft to semi-fluid in consistency.

Example 114a

| | Grams |
|---|---|
| Dodecylphenol | 262 |
| Benzaldehye | 106 |
| Oxalic acid | 2.5 |
| Xylene | 100 |

The procedure followed was that of Example 87a. The solvent-free resin was clear, light in color, xylene-soluble, and soft to pliable in consistency.

Example 115a

| | Grams |
|---|---|
| Decylphenol | 234 |
| Formaldehyde, 37% | 81 |
| NaOH in 20 cc. H$_2$O | 4.5 |
| Monoalkyl (C$_{10}$-C$_{20}$, principally C$_{12}$-C$_{14}$) benzene monosulfonic acid sodium salt__ | 1.5 |
| Xylene | 200 |

The procedure used was the same as that of Example 98a. The solvent-free resin was opaque, xylene-dispersible, amber in color and semi-hard or pliable in consistency.

Example 116a

| | Grams |
|---|---|
| Menthyl phenol (1.0 mole) | 232 |
| Nonylphenol (1.0 mole) | 220 |
| Formaldehyde,37% (2.0 moles) | 162 |
| Oxalic acid | 1.5 |
| Monoalkyl (C$_{10}$-C$_{20}$, principally C$_{12}$-C$_{14}$) benzene monosulfonic acid sodium salt___ | 1.5 |
| Xylene | 200 |

The procedure followed was that of Example 1a. The resulting product was light amber-colored resin having a melting point of 115° to 120° C. The solvent-free resin was similar in appearance to the resin of Example 80a.

Example 117a

| | Grams |
|---|---|
| Para-tertiary butyl phenol (7.0 mole) | 1050 |
| Formaldehyde 38.7% (6.65 mole) | 516 |
| Oxalic acid | 5 |
| Dioctyl ester of sodium sulfosuccinic acid__ | 2 |

All the materials were placed in a 3-liter three-necked glass flask fitted with an efficient stirrer, thermometer and reflux condenser and agitated continuously. The mixture was refluxed for 85 minutes at 88°–92° C., at which time it became a thick, creamy mass. It was dehydrated by distilling at 97°–162° C., for 5 hours. A total of 395 grams of water was removed. Yield was 1112 grams of hard, brittle, yellow resin, of melting point 118°–126° C.

Example 118a 1050 grams of p-tertiary butyl phenol, 500 grams of 39.7% formaldehyde, 5 grams of oxalic acid and 2 grams of Aerosol O. T. are refluxed for 85 minutes at 88°–92° C., and then dehydrated by distilling at 97°–148° C. for 5 hours. 403 grams of water in one case were removed. The product was a hard, brittle, yellow resin, melting at 124°–127° C., yield 1093 grams.

In a number of the foregoing examples, phenols have been identified simply as "nonyl phenol," or "octadecyl phenol," or the like, without specific designation of the position of substitution or the structure of the substituent radical. In such a cases, the phenols meant are either the commercial products distributed under these names, or, if the products are not commercially available, the products obtained by customary syntheses from phenol, metacresol or 3,5-xylenol, and consist mainly of the parasubstituted product, usually associated with some of the ortho-substituted product, perhaps a very small proportion of meta-substituted material, some impurities, etc. Also it is to be understood that all of the products of the foregoing examples, unless it is otherwise stated in the example, are soluble in xylene, at least to an extent sufficient to permit the use of xylene as the solvent in oxyalkylation.

It will be noted that the resins used as parent materials, as illustrated by Examples 1a to 118a, are 2,4,6 (i. e., 2,4, or 6) C$_4$- to C$_{18}$- hyrocarbon-substituted monocyclic phenol—C$_1$- to C$_8$- aldehyde resins. Advantageously the resin molecule has 3 to 7 phenolic residues; it may have more.

As far as the manufacture of resins is concerned it is usually most convenient to employ a catalyst such as illustrated by most of the preceding examples.

Previous reference has been made to the use of a single phenol, as herein specified, or a single reactive aldehyde or a single oxyalkylating agent. Obviously, mixtures of phenolic reactants may be employed, as for example, a mixture of para-amylphenol and para-butylphenol, or a mixture of para-butylphenol and para-hexylphenol, or para-butylphenol and para-phenylphenol. It is extremely difficult to depict the structure of a resin derived from a single phenol. When mixtures of phenols are used, even in equimolar proportions, the structure of the resin is even more indeterminable. In other words, a mixture involving para-butylphenol and para-amylphenol might have an alternation of the two nuclei, or might have a series of butylated nuclei and then a series of amylated nuclei. If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends on the relative reactivity of the aldehydes. For that matter, one might be producing simultaneously two different resins, in what would actually be a mechanical mixture. Similarly, as has been suggested, one might use a combination of oxyalkylating agents; for instance, one might partially oxyalkylate with ethylene oxide and then finish with propylene oxide. It is understood that the use of oxyalkylated derivatives of such resins, derived from such plurality of reactants instead of being limited to a single reactant from each of the three classes, is contemplated and here included for the reason that they are obvious variants.

PART 2

Having obtained a suitable resin of the kind described, such resin is subjected to treatment with a low molal reactive alpha-beta olefine oxide so as to introduce, on a statistical basis, from ½ up to somewhat less than 2 alkyleneoxy groups per phenolic hydroxyl. The olefine oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxypropylene oxide and methyl glycide as a hydroxybutylene oxide. In any event, however, all such reactants contain the reactive ethylene oxide ring and may be best considered as derivatives of or substituted ethylene oxides. Since ethylene oxide is the cheapest alkylene oxide available and is reactive, its use is definitely advantageous. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if an acid is used to catalyze the resinification reaction, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent, such as xylene, cymene, decalin, ethylene glycol, diethylether, diethyleneglycol diethylether, or the like, although with many resins, the oxyalkylation proceeds satisfactorily without a solvent. Since xylene is cheap and may be permitted to be present in the final product used for some purposes, e. g., as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings, of course, represent total pressure, i. e., the combined pressure, due to xylene and also due to ethylene oxide or whatever other oxyalkylating agent is used. Under such circumstances, it may be necessary at times to use substantial pressures to obtain effective results, for instance, pressures up to 300 pounds, along with correspondingly high temperatures, if required.

Attention is directed to the fact that the resins herein described must be fusible or soluble in an organic solvent. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed, solvents, which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, but which are useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent, or the fact that it is fusible, means that it consists of separate molecules. Phenolaldehyde resins of the type herein specified possess reactive hydroxyl groups and are oxyalkylation-susceptible.

Based on molecular weight determinations, most of the resins prepared, as herein described, particularly in the absence of a secondary heating step, contain 3 to 6 or 7 phenolic nuclei, with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or an acid catalyst is advantageously used in preparing the resin. A combination of catalysts is sometimes used in two stages. For instance, an alkaline catalyst is sometimes employed in a first stage, followed by neutralization an addition of a small amount of acid catalyst in a second stage. It is generally believed that even in the presence of an alkaline catalyst, the number of moles of aldehyde, such as formaldehyde, must be greater than the moles of phenol employed, in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of between 0.90 and 1.20, and, as far as we have been able to determine, such resins are free from methylol groups. As a matter of fact, it is probable that in acid-catalyzed resinifications, the methylol structures may appear only momentarily at the very beginning of the reaction and in all probability is converted at once into a more complex structure during the intermediate stage.

One procedure which can be employed in the use of a new resin to prepare products of the invention is to determine the hydroxyl value by the Verley-Bölsing method or its equivalent.

The resin as such, or in the form of a solution as described, is then treated with ethylene oxide in presence of 0.5% to 2% of sodium methylate as a catalyst. The conditions of reaction, as far as time or percent are concerned, are within the range previously indicated. With suitable agitation, the ethylene oxide combines within a comparatively short time, for instance, a few minutes to 2 to 6 hours, but in some instances required as much as 8 to 24 hours. A useful temperature range is from 125° to 225° C. The completion of the reaction of each addition of ethylene oxide, if more than one addition are used in step-wise fashion, is usually indicated by the reduction or elimination of pressure. All of the ethylene oxide is added usually in one step.

It may be well to emphasize the fact that when resins are produced from difunctional phenols and some of the higher aliphatic aldehydes, such as acetaldehyde, the resultant is a comparatively soft resin. Such resins become comparatively fluid at 110° to 165° C., as a rule, and thus can be readily oxyalkylated, preferably oxyethylated, without the use of a solvent.

If one purchases a thermoplastic or fusible resin on the open market selected from a suitable number which are available, one might have to make certain determinations in order to make the quickest approach to the appropriate oxyalkylation range. For instance, one should know (a) the molecular size, indicating the number of phenolic units; (b) the nature of the aldehydic residue, which is usually $CH_2$; and (c) the nature of the substituent, which is usually butyl, amyl, or phenyl. With such information one is in substantially the same position as if one had personally made the resin prior to oxyethylation.

For instance, the molecular weight of the internal structural units of the resin of the following over-simplified formula:

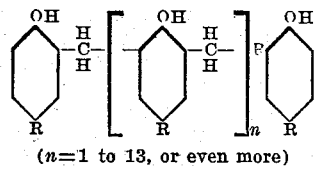

($n=1$ to 13, or even more)

is given approximately by the formula: (Mol. Wt. of phenol−2) plus Mol. Wt. of methylene or substituted methylene radical. The molecular weight of the resin would be $n$ times the value for the internal limit, plus the values for the terminal units. The left-hand terminal unit of the above structural formula, it will be seen, is identical with the recurring internal unit, except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecule has only 3 phenolic nuclei as in the structure shown, this calculation will be in error by several percent; but as it grows larger, to contain 6, 9 or 12 phenolic nuclei, the formula comes to be more than satisfactory. Using such an approximate weight, one need only introduce, for example, from ½ to something less than 2 molal weights of ethylene oxide per phenolic nucleus, to produce a useful intermediate. Advantageously, about one mole, or slightly more, is used, so that the oxyalkylated product is substantially free from phenolic hydroxyl groups.

In Examples 1b to 5b, and the table which follows, directions are given for the production of the oxyalkylated intermediates which are the final compositions of the invention. Because of advantages which follow from the use of ethylene oxide, partly because of its low cost and partly because of the excellent results it gives, most of the examples relate to oxyalkylation with ethylene oxide. However, oxyalkylation with propylene oxide, butylene oxide, glycide and methylglycide, gives substantially equivalent products. Glycide, if used, should be handled with great caution.

*Example 1b*

4350 grams of the resin of Example 117a dissolved in 4350 grams of hot xylene were placed in a stainless steel autoclave with 19 grams of sodium methylate and 1200 grams of ethylene oxide, and the mixture was heated to 150° C., when a drop in pressure was noted. The maximum pressure observed during the operation was 120 p. s. i. gauge. Heating was continued until the temperature reached 245° C., when the heat was shut off and the autoclave allowed to cool. Time above 150° C. was 1¾ hours. The product obtained was a light tan semi-crystalline mass.

*Example 2b*

The same reactants and procedure were employed as in Example 1b, preceding, except that propylene oxide was used instead of ethylene oxide, in equivalent proportions. The final product was very similar to the product of Example 1b. Butylene oxide, similarly used, gives a similar product.

*Example 3b*

The same reactants were employed as in Example 1b, except that the equivalent amount of glycide was used instead of ethylene oxide, the reaction was conducted with extreme care and the glycide was added in small proportions, followed by the allowance of time for reaction before the addition of the next portion. Again the product was similar to the product of Example 1b in appearance.

*Example 4b*

594 grams of the resin of Example 10a dissolved in 396 grams of xylene and 2.4 grams of sodium methylate and 175 grams of ethylene oxide were charged into a stainless steel autoclave and heated to 148° C. The maximum pressure observed was 100 p. s. i. gauge. The reaction time was 2.5 hours. The solvent-free oxyethylated resin had a melting point of 58° to 66° C.

*Example 5b*

322.8 grams of the resin of Example 118a, slurried with 322.8 grams of xylene, and admixed with 88 grams of ethylene oxide and 1.5 grams of sodium methylate, were charged into the stainless steel autoclave. The maximum temperature observed as 198° C., and the maximum pressure 101 p. s. i. gauge. The reaction time was 3 hours. The xylene-containing reaction product was a semi-crystalline mass.

In the table which follows are given the data for the oxyethylation with amounts of ethylene oxide ranging from about one-half mole to something less than two moles per hydroxyl equivalent (of the resin) of a large number of the resins, the production of which is illustrated in Examples 1a through 118a.

The first column (A) gives the example number where the production of the resin is described; the second column (B) gives the weight, in grams, of the resin which is oxyethylated; the third (C), the weight, in grams, of the solvent in the solution; the fourth (D), the weight, in grams, of catalyst (sodium methylate) used; the fifth (E), the amount of ethylene oxide added, in grams; the sixth (F), the maximum temperature used; the seventh (G), the maximum pressure observed, in pounds per square inch gauge; and the eighth (H), the time of reaction in hours.

| A | B | C | D | E | F | G | H |
|---|---|---|---|---|---|---|---|
| 1a | 162 | 162 | 1.6 | 44 | 145 | 175 | 3 |
| 2a | 162 | 162 | 1.6 | 44 | 150 | 170 | 3 |
| 3a | 218 | 218 | 1.8 | 44 | 155 | 165 | 3.5 |
| 4a | 196 | 196 | 1.8 | 44 | 150 | 165 | 3 |
| 5a | 196 | 196 | 1.8 | 44 | 150 | 160 | 3.5 |
| 6a | 162 | 162 | 1.8 | 44 | 145 | 170 | 2.5 |
| 7a | 202 | 202 | 1.8 | 44 | 160 | 160 | 3 |
| 8a | 218 | 218 | 1.8 | 44 | 160 | 165 | 3 |
| 9a | 196 | 196 | 1.8 | 44 | 155 | 160 | 3 |
| 10a | 594 | 396 | 2.4 | 112 | 149 | 100 | 1 |
| 10a | 594 | 396 | 2.4 | 80 | 155 | 40 | 4 |
| 10a | 594 | 396 | 2.4 | 225 | 150 | 75 | 3 |
| 10a | 594 | 396 | 2.4 | 235 | 160 | 100 | 4 |
| 11a | 5,370 | 6,690 | 26.9 | 1,420 | 209 | 70 | 6 |
| 11a | 5,400 | 6,700 | 27.1 | 700 | 204 | 65 | 5 |
| 11a | 5,350 | 6,680 | 27.0 | 2,700 | 212 | 85 | 7 |
| 12a | 162 | 162 | 1.6 | 44 | 140 | 170 | 3 |
| 13a | 162 | 162 | 1.6 | 44 | 154 | 126 | 2 |
| 14a | 176 | 176 | 1.8 | 44 | 160 | 155 | 2.5 |
| 15a | 176 | 176 | 1.8 | 44 | 130 | 135 | 4 |
| 16a | 176 | 176 | 1.8 | 44 | 160 | 105 | 2 |
| 17a | 176 | 176 | 1.8 | 44 | 150 | 100 | 2.5 |
| 18a | 190 | 190 | 1.8 | 44 | 165 | 150 | 4 |
| 19a | 218 | 218 | 1.8 | 44 | 165 | 155 | 4 |
| 20a | 182 | 182 | 1.8 | 44 | 150 | 150 | 2.5 |
| 21a | 188 | 188 | 1.9 | 44 | 155 | 120 | 4.5 |
| 22a | 210 | 210 | 2.1 | 44 | 155 | 125 | 5 |
| 23a | 176 | 176 | 1.8 | 44 | 155 | 145 | 3.3 |
| 24a | 176 | 176 | 1.8 | 44 | 148 | 148 | 3.5 |
| 25a | 176 | 176 | 1.8 | 44 | 140 | 125 | 6 |
| 26a | 176 | 176 | 1.8 | 44 | 150 | 140 | 6 |
| 27a | 190 | 190 | 1.9 | 44 | 156 | 130 | 4.5 |
| 28a | 190 | 190 | 1.9 | 44 | 140 | 95 | 1 |
| 29a | 190 | 190 | 1.8 | 44 | 145 | 115 | 3 |
| 30a | 190 | 190 | 1.9 | 44 | 130 | 140 | 2.5 |
| 31a | 232 | 232 | 2.3 | 44 | 130 | 130 | 3 |
| 31a | 232 | 232 | 2.4 | 73 | 140 | 125 | 4 |
| 31a | 232 | 232 | 2.3 | 31 | 145 | 135 | 4.5 |
| 32a | 196 | 196 | 2.0 | 44 | 150 | 125 | 3 |
| 33a | 202 | 202 | 2.0 | 44 | 135 | 135 | 1 |
| 34a | 224 | 224 | 2.2 | 44 | 135 | 145 | 4 |
| 35a | 260 | 260 | 2.6 | 44 | 145 | 130 | 3.5 |
| 35a | 260 | 260 | 2.5 | 33 | 140 | 125 | 3 |
| 35a | 260 | 260 | 2.6 | 66 | 145 | 135 | 3 |
| 36a | 246 | 246 | 2.4 | 44 | 140 | 130 | 3 |
| 37a | 246 | 246 | 2.5 | 44 | 145 | 135 | 3 |
| 38a | 266 | 266 | 2.7 | 44 | 145 | 133 | 0.5 |
| 39a | 272 | 272 | 2.7 | 44 | 150 | 140 | 0.8 |
| 40a | 252 | 252 | 2.5 | 44 | 135 | 96 | 2.5 |
| 41a | 238 | 238 | 2.4 | 44 | 144 | 160 | 4.5 |
| 42a | 238 | 238 | 2.4 | 44 | 150 | 125 | 1.5 |
| 43a | 258 | 258 | 2.6 | 44 | 135 | 90 | 0.8 |
| 44a | 264 | 264 | 2.6 | 44 | 135 | 150 | 5.5 |
| 45a | 204 | 204 | 2.0 | 44 | 142 | 92 | 4.5 |
| 46a | 190 | 190 | 1.9 | 44 | 144 | 153 | 3 |
| 47a | 190 | 190 | 1.9 | 44 | 125 | 120 | 2 |
| 48a | 210 | 210 | 2.1 | 44 | 140 | 130 | 0.8 |
| 49a | 216 | 216 | 2.2 | 44 | 142 | 120 | 2 |
| 50a | 272 | 272 | 2.7 | 44 | 138 | 133 | 5.3 |
| 51a | 258 | 258 | 2.6 | 44 | 142 | 132 | 1.5 |
| 52a | 314 | 314 | 3.1 | 44 | 148 | 140 | 3.5 |
| 53a | 242 | 242 | 2.4 | 44 | 113 | 107 | 2 |
| 54a | 221 | 221 | 2.2 | 55 | 120 | 110 | 3 |
| 55a | 176 | 176 | 1.8 | 44 | 165 | 160 | 2 |
| 56a | 162 | 162 | 1.6 | 44 | 140 | 160 | 2 |
| 56a | 162 | 162 | 1.6 | 59 | 145 | 155 | 2 |
| 56a | 162 | 162 | 1.6 | 29 | 145 | 160 | 2 |
| 57a | 182 | 182 | 1.8 | 44 | 150 | 145 | 2 |
| 58a | 188 | 188 | 1.8 | 44 | 155 | 150 | 2.5 |
| 59a | 162 | 162 | 1.6 | 44 | 150 | 140 | 2 |
| 60a | 176 | 176 | 1.8 | 44 | 155 | 150 | 2 |
| 61a | 162 | 162 | 1.6 | 44 | 155 | 145 | 2 |
| 62a | 218 | 218 | 2.2 | 44 | 160 | 150 | 3 |
| 62a | 218 | 218 | 2.3 | 79 | 150 | 145 | 2.5 |
| 62a | 218 | 218 | 2.2 | 35 | 165 | 155 | 3.5 |
| 63a | 176 | 176 | 1.8 | 44 | 160 | 155 | 2 |
| 64a | 162 | 162 | 1.6 | 44 | 150 | 140 | 2 |
| 65a | 182 | 182 | 1.8 | 44 | 155 | 150 | 2 |
| 66a | 188 | 188 | 1.9 | 44 | 155 | 130 | 2.5 |
| 67a | 162 | 162 | 1.6 | 44 | 150 | 145 | 2 |
| 68a | 176 | 176 | 1.8 | 44 | 150 | 145 | 2 |
| 69a | 162 | 162 | 1.6 | 44 | 150 | 140 | 2.5 |
| 70a | 218 | 218 | 2.2 | 44 | 155 | 150 | 3.5 |
| 71a | 176 | 176 | 1.8 | 44 | 150 | 140 | 2 |
| 72a | 176 | 176 | 1.8 | 44 | 160 | 155 | 2 |
| 73a | 218 | 218 | 2.2 | 44 | 160 | 150 | 4.5 |
| 74a | 188 | 188 | 1.9 | 44 | 150 | 135 | 4 |
| 75a | 182 | 182 | 1.8 | 44 | 145 | 140 | 2 |
| 76a | 190 | 190 | 1.9 | 44 | 150 | 140 | 4 |
| 77a | 176 | 176 | 1.8 | 44 | 155 | 145 | 5 |
| 78a | 232 | 232 | 2.3 | 44 | 135 | 130 | 3 |
| 79a | 176 | 176 | 1.8 | 44 | 140 | 106 | 3 |
| 80a | 244 | 244 | 2.5 | 44 | 150 | 140 | 1 |
| 80a | 244 | 244 | 2.5 | 23 | 155 | 145 | 1.5 |
| 80a | 244 | 244 | 2.5 | 62 | 145 | 135 | 0.8 |
| 81a | 232 | 232 | 2.3 | 44 | 140 | 100 | 0.8 |
| 81a | 232 | 232 | 2.3 | 85 | 135 | 110 | 1.0 |
| 81a | 232 | 232 | 2.3 | 22 | 150 | 120 | 1.5 |
| 82a | 358 | 358 | 3.6 | 44 | 150 | 140 | 2 |
| 82a | 358 | 358 | 3.6 | 79 | 145 | 125 | 3 |
| 82a | 358 | 358 | 3.6 | 24 | 140 | 120 | 3 |
| 83a | 224 | 224 | 2.2 | 44 | 155 | 162 | 0.5 |
| 84a | 246 | 246 | 2.5 | 44 | 158 | 185 | 3.5 |
| 85a | 274 | 274 | 2.7 | 44 | 152 | 190 | 1.3 |
| 85a | 274 | 274 | 2.7 | 84 | 165 | 170 | 2 |
| 85a | 274 | 274 | 2.7 | 26 | 170 | 180 | 2 |
| 86a | 232 | 232 | 2.3 | 44 | 138 | 82 | 1 |
| 87a | 258 | 258 | 2.6 | 44 | 150 | 140 | 2 |
| 88a | 246 | 246 | 2.5 | 44 | 145 | 140 | 3 |
| 88a | 246 | 246 | 2.5 | 75 | 150 | 145 | 2 |
| 88a | 246 | 246 | 2.5 | 22 | 160 | 150 | 3 |
| 89a | 372 | 372 | 3.7 | 44 | 160 | 145 | 2 |
| 89a | 372 | 372 | 3.7 | 84 | 155 | 135 | 4 |
| 89a | 372 | 372 | 3.7 | 22 | 160 | 140 | 3 |
| 90a | 328 | 328 | 3.3 | 44 | 144 | 133 | 10 |
| 91a | 316 | 316 | 3.2 | 44 | 140 | 130 | 2 |
| 92a | 320 | 320 | 3.2 | 44 | 135 | 130 | 5 |
| 93a | 308 | 308 | 3.1 | 44 | 140 | 135 | 6 |
| 94a | 272 | 272 | 2.7 | 44 | 145 | 130 | 4 |
| 95a | 260 | 260 | 2.6 | 44 | 150 | 140 | 3 |
| 96a | 328 | 328 | 3.3 | 44 | 144 | 115 | 2.5 |
| 97a | 340 | 340 | 3.4 | 44 | 150 | 140 | 3 |
| 98a | 244 | 244 | 2.4 | 44 | 140 | 130 | 4 |
| 99a | 232 | 232 | 2.3 | 44 | 150 | 95 | 1.5 |
| 100a | 232 | 232 | 2.3 | 44 | 125 | 130 | 5 |
| 101a | 298 | 298 | 3.0 | 44 | 135 | 145 | 1 |
| 102a | 310 | 310 | 3.1 | 44 | 165 | 165 | 1 |
| 103a | 232 | 232 | 2.3 | 44 | 150 | 128 | 4 |
| 104a | 232 | 232 | 2.3 | 44 | 130 | 125 | 4 |
| 105a | 244 | 244 | 2.4 | 44 | 140 | 120 | 2.3 |
| 106a | 232 | 232 | 2.3 | 44 | 145 | 105 | 1 |
| 107a | 244 | 244 | 2.4 | 44 | 145 | 135 | 3 |
| 108a | 232 | 232 | 2.3 | 44 | 140 | 125 | 2 |
| 109a | 232 | 232 | 2.3 | 44 | 142 | 134 | 2.5 |
| 110a | 232 | 232 | 2.3 | 44 | 150 | 145 | 4 |
| 111a | 246 | 246 | 2.5 | 44 | 135 | 140 | 2 |
| 112a | 274 | 274 | 2.7 | 44 | 140 | 145 | 2.5 |
| 113a | 274 | 274 | 2.7 | 44 | 150 | 140 | 3 |
| 114a | 350 | 350 | 3.5 | 44 | 142 | 138 | 4 |
| 115a | 246 | 246 | 2.5 | 44 | 150 | 140 | 2 |
| 116a | 238 | 238 | 2.4 | 44 | 155 | 135 | 3 |

Reference is made to a number of our co-pending applications, for example, Serial Nos. 65,080 (now Patent No. 2,542,000, dated February 20, 1951) and 65,081, both filed December 13, 1948. In the aforementioned co-pending applications of De Groote and Keiser, there has been described the preparation of oxyalkylated derivatives by continuous addition of the ethylene oxide. In the continuous addition of ethylene oxide there has been employed either a cylinder of ethylene oxide without added nitrogen, provided the ethylene oxide is sufficiently great to pass into the autoclave; or else there has been provided an arrangement, which, in essence, is the equivalent of an ethylene oxide cylinder with a means of injecting nitrogen so as to force out the ethylene oxide in the manner of an ordinary seltzer bottle, combined with the means for either weighing the cylinder or measuring volumetrically the ethylene oxide used. Such procedure and arrangement for injecting liquids is, of course, conventional. The following data sheets exemplify such operations, i. e., the combination of both continuous agitation and taking samples so as to give five different variants in oxyethylation. In adding ethylene oxide continuously, there is one precaution which must be taken at all times; the addition of ethylene oxide must stop immediately if there is any indication that reaction has stopped, or, obviously, if reaction has not started at the beginning of the reaction period. Since the addition of ethylene oxide is invariably an exothermic reaction, whether or not reaction has taken place can be judged in the usual manner by observing (a) temperature rise or drop, if any, (b) amount of cooling water or other means required to dissipate heat of reaction; thus, if there is a temperature drop without the use of cooling water or equivalent, or if there is no rise in temperature without using cooling water control, careful investigation should be made.

In the subsequent data, the maximum temperature which is usually the operating temperature, has been indicated. In other words, by experience it has been found that if the initial reactants are raised to the indicated temperature, and if ethylene oxide is added slowly, this temperature is maintained by cooling until oxyethylation is complete. Likewise, the maximum pressure obtained, or the pressure range, has been indicated. This is also true with the time required.

The resins employed are prepared in the manner described in various previous examples, Nos. 1a through 103a, inclusive. Instead of being prepared on a laboratory scale, they were prepared in 10 to 15-gallon electro-vapor-heated synthetic resin pilot plant reactors, as manufactured by the Blaw-Knox Company, Pittsburgh, Pennsylvania, and completely described in their Bulletin No. 2087, issued in 1947, with specific reference to Specification No. 71—3965.

For convenience, the numbers given in the following tables are the same as the identical laboratory size batches previously described, and it is understood that they were simply stepped up in size, but otherwise made in the pilot plant equipment previously described.

The solvent used in each instance was xylene. This solvent is particularly satisfactory, for the reason that it can be removed readily by distillation or vacuum distillation. In these continuous experiments the speed of the stirrer in the autoclave was 250 R. P. M.

derived from any detergent-forming monocarboxy acid having 8 to 32 carbon atoms, with the proviso that at least one acyl radical is derived from a hydroxylated detergent-forming monocarboxy acid having 8 to 32 carbon atoms, each of the hydroxyls of each polyhydric alcohol being esterified with a group containing at least one of said acyloxy radicals, the number of said groups esterified with polyhydric alcohol hydroxyls being as great as the total number of said polyhydric alcohol hydroxyls. In other words, the number of the groups comprising an acyloxy radical derived from a detergent-forming monocarboxy acid that are ester-linked to each polyhydric alcohol radical, is in each instance equal to the valency of the polyhydric alcohol radical, so that in the ester product each polyhydric alcohol radical is free from any uncombined hydroxyl radical directly attached thereto, and the number of such groups ester-linked to each polyhydric alcohol residue is additional to the number of such groups ester-linked to any other polyhydric alcohol residue contained in the ester.

Detergent-forming monocarboxy acids are those acids having at least 8 carbon atoms which have the capacity to react with alkali to form soap or soap-like products, and are exemplified by fatty acids containing 8 to 32 carbon atoms, such as oleic, linoleic, ricinoleic, stearic, hydroxystearic, palmitic, linolenic, erucic, clupanodonic, myristic, etc., and fatty acids of the character referred to are normally regarded as preferable. The term "detergent-forming monocarboxy acid" includes naphthenic acids. Naphthenic acids are derived from various petroleums, or are obtained by treatments which involve oxi-

| Phenol Employed | Aldehyde employed | Resin Ex. No. | Oxyalkylated Derivative Ex. No. | Reaction Mix to give Oxyalkylated Derivative | | | Max. Pressure lbs. sq. in. | Max. Temperature, °C. | Time, hours |
|---|---|---|---|---|---|---|---|---|---|
| | | | | Lbs. Solvent | Lbs. Resin | Lbs. ETO | | | |
| Para-tertiary amyl | Formaldehyde | 10a | 104b | 14.25 | 15.75 | 4.0 | 80 | 150 | 1/4 |
| Nonyl | do | 81a | 109b | 15.0 | 15.0 | 3.0 | 50 | 150 | 1¾ |
| Para-octyl | do | 19a | 114b | 14.2 | 15.8 | 3.25 | 50 | 150 | 1 1/12 |
| Menthyl | do | 80a | 119b | 13.65 | 16.35 | 3.00 | 60 | 150 | 1⅙ |
| Para-secondary butyl | do | 13a | 124b | 14.45 | 15.55 | 4.25 | 60 | 150 | 5/12 |
| Menthyl | Propionaldehyde | 94a | 129b | 12.8 | 17.2 | 2.75 | 110 | 150 | 1/3 |
| Para-tertiary amyl | Furfural | 53a | 134b | 11.2 | 18.0 | 3.50 | 120 | 135 | 1/4 |
| Menthyl | do | 102a | 139b | 10.25 | 17.75 | 2.5 | 90 | 150 | 1/6 |
| Para-octyl | do | ¹53a | 144b | 12.1 | 18.6 | 3.0 | 80 | 150 | 1/12 |
| Para-phenyl | do | ²53a | 149b | 13.9 | 16.7 | 3.0 | 100 | 160 | 1/3 |
| Para-nonyl | do | 101a | 154b | 10.85 | 20.75 | 3.0 | 100 | 150 | 1/3 |
| Para-secondary butyl | do | ³53a | 161b | 12.0 | 17.9 | 3.5 | 150 | 171 | 1/6 |
| Para-octyl | Propionaldehyde | ⁴45a | 166b | 13.3 | 16.9 | 3.0 | 100 | 150 | 1/3 |
| Para-nonyl | do | 95a | 171b | 10.9 | 18.0 | 3.0 | 120 | 150 | 1/12 |
| Para-tertiary amyl | do | 45a | 176b | 12.6 | 16.2 | 3.5 | 105 | 150 | 1/12 |

¹ Corresponding to 53a except that 206 parts by weight of commercial para-octylphenol replaced 164 parts by weight of para-tertiary amylphenol.
² Corresponding to 53a except that 170 parts by weight of commercial para-phenylphenol replaced 164 parts by weight of para-tertiary amylphenol.
³ Corresponding to 53a except that 150 parts by weight of commercial para-secondary butylphenol replaced 164 parts by weight of para-tertiary amylphenol.
⁴ Corresponding to 45a except that 206 parts by weight of commercial para-octylphenol replaced 164 parts by weight of para-tertiary amyl-phenol.

PART THREE

The preparation of the compounds used as the constituent characterized as being an acidic partial ester, have been described completely in the aforementioned U. S. Patent No. 2,442,073. The following subject-matter is substantially the verbatim text of this patent:

The acidic partial ester consists of an ester product containing a polyhydric alcohol radical, a diglycollic acid radical and a plurality of acyloxy radicals

dation of hydrocarbon bodies present in the naturally-occurring crude oils. The number of carbon atoms in naturally-occurring naphthenic acids may vary from 10 carbon atoms to 32 or even 38 carbon atoms. Naphthenic acid or admixtures of the type available on the open market and which preferably have a saponification value in the neighborhood of about 250 are suitable. Naphthenic acids of the kind referred to are readily esterified with glycerol to form naphthenin on intimate admixture and agitation in the presence of dried hydrochloric acid gas, using a procedure that is substantially the same as that usually in the formation of stearin from stearic acid and glycerol. It is known that such naphthenic acids can be treated, for example, with halogens so as to produce derivatives such as chloro-naphthenic acids. Also included among the detergent-forming acids are those monocarboxy acids sometimes called wax acids or paraffin acids, which are formed as a result of oxidation of paraffin or petroleum waxes, particularly those derived from paraffin base hydrocarbons and which include hydroxylated, as well as non-hydroxlyated acids. Acids occurring in certain waxes, such as carnaubic acid, cerotic acid, lanopalmic acid and lanoceric acid, are considered detergent-forming monocarboxy acids. Rosin and resinic acids, such as abietic acid are likewise included. Such acid materials, due to the fact that they react with alkalis to form soap or soap-like products, are commonly called detergent-forming acids.

The terms hydroxylated detergent-forming acids and hydroxy-detergent-forming acids, refer to those detergent-forming acids which contain in the acyl radical thereof an hydroxyl or the equivalent. The most common types of hydroxylated detergent-forming carboxy acids are hydroxylated fatty acids containing 8 to 32 carbon atoms, such as ricinoleic acid, monohydroxy and dihydroxystearic acid, trihydroxypalmitic acid, etc. Ester products adapted for use as raw materials in the invention herein described, contain at least one radical of an hydroxylated detergent-forming acid, and preferably, such radical is a radical of an hydroxylated fatty acid containing 8 to 32 carbon atoms. In addition, hydroxylated detergent-forming acids, such as hydroxylated wax acids may be used.

While the terms detergent-forming monocarboxy acid and hydroxylated detergent-forming monocarboxy acid include oxidized acids, as well as acids in their naturally-occurring state, those fatty bodies which are drastically-oxidized have distinctive properties and characteristics and certain ester products containing such drastically-oxidized bodies are claimed in our co-pending application Serial No. 604,996, filed July 13, 1945, now abandoned.

A preferred ester derivative exemplifying the herein contemplated compounds, and especially those for breaking oil field emulsions, may be obtained by esterification reaction between triricinolein and diglycollic acid. Ricinoleic acid may be indicated by the following formula:

$$CH_2(CH_2)_5.\overset{OH}{\underset{|}{C}H}.CH_2.CH=CH(CH_2)_7.COOH$$

which may be regarded as coming within the more generic formula:

$$OHRCOOH$$

wherein OHRCOO is representative of the acyloxy group of any hydroxylated detergent-forming carboxy acid. If OHRCOO is the acyloxy group of ricinoleic acid, triricinolein may be represented by the formula:

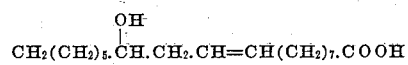

and contains the residue of the polyhydric alcohol glycerol which may be represented as

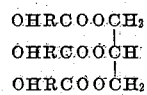

Triricinolein readily esterifies with diglycollic acid, and if three moles of diglycollic acid are caused to react with one mole of triricinolein, an ester product will be obtained according to the following reaction:

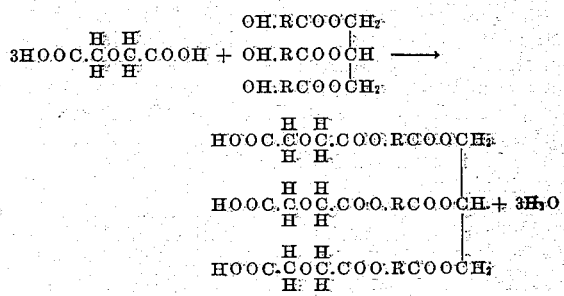

As previously suggested, the foregoing product of esterification is a particularly preferred material for breaking oil field emulsions in the practice of this invention. In the above product it is to be noted that each hydroxyl of polyhydric alcohol (glycerol) is esterified with a group containing an acyloxy radical derived from ricinoleic acid. In this application only those compounds are contemplated wherein each hydroxyl of each polyhydric alcohol is esterified with a group containing an acyloxy radical derived from a detergent-forming monocarboxy acid having 8 to 32 carbon atoms. It is not necessary that each of the hydroxyls contained in an acyloxy radical be esterified, although this is a characteristic of preferred compounds contemplated herein. For example, the hydroxyl in only one or two of the ricinoleic residues may be replaced by a glycollic acid residue.

In carrying on the esterification reaction, it is not essential that a carboxylic group of the diglycollic acid react with the alcoholiform hydroxyl in the acyloxy radical of an hydroxylated detergent-forming acid body while the acyloxy radical of the detergent-forming carboxy acid remains directly connected with the polyhydric alcohol radical. Thus, in the esterification reaction above mentioned, there may be some molecular rearrangement with the production of a compound which may be represented by the following formula:

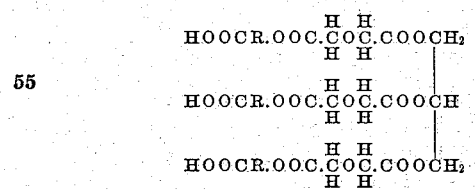

The compound above represented is likewise suitable for use for breaking oil field emulsions in the practice of this invention. It is to be noted that in this compound also there is the characteristic occurrence of a group containing at least one acyloxy radical derived from a detergent-forming carboxy acid esterified with each hydroxyl of polyhydric alcohol. In this particular example the group containing the acyloxy radical (RCOO) that is, esterified with the hydroxyls of the polyhydric alcohol, is the group:

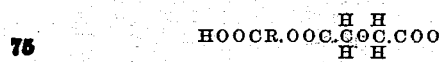

The compounds covered herein do not include compounds such as

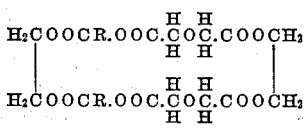

wherein the number of groups containing an acyloxy radical derived from a detergent-forming monocarboxy acid and esterified with hydroxyls of each polyhydric alcohol (two glycol residues in the example above given), is less than the total number of polyhydric alcohol hydroxyls. In the example given there is a total of four polyhydric alcohol hydroxyls and only two groups containing an acyloxy radical derived from a detergent-forming monocarboxy acid esterified therewith.

While the modifications wherein the acyloxy radical derived from the detergent-forming carboxy acid remains directly connected to the polyhydric alcohol residue is normally preponderant and is normally preferred, the other modifications wherein one or more of the diglycollic acid radicals becomes directly attached to the polyhydric alcohol radical are suitable.

In the foregoing and in subsequent formulae, a conventional showing in two dimensional form is resorted to, and no attempt other than this is made to indicate actual space molecular formula. Moreover, distinctions between isomeric forms are to be disregarded.

As a further example of the practice of this invention, diglycollic acid may be reacted with an hydroxylated ester, wherein each of the hydroxyls of glycol is replaced by a residue of hydroxystearic acid or ricinoleic acid, the reaction being as follows:

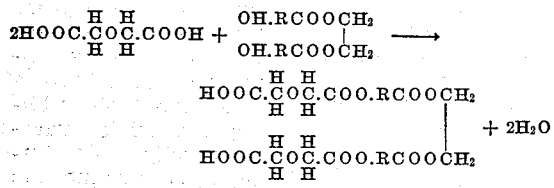

It is also possible that during the esterification there may be only partial molecular rearrangement, so that in the resulting product, one acyloxy radical of a detergent-forming monocarboxy acid may be directly linked to the polyhydric alcohol radical and another acyloxy radical of a detergent-forming monocarboxy acid may be directly linked to a diglycollic acid radical, which, in turn, may be directly linked to the polyhydric alcohol radical. Thus, in the foregoing reaction involving glycol, a reaction product may be formed corresponding with the formula:

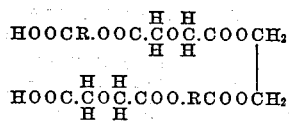

and such compounds are also suitable for breaking oil field emulsions according to this invention.

It is not essential that each of the acyloxy radicals derived from a detergent-forming acid that is present in the ester product for each of the hydroxyl groups of the parent polyhydric alcohol be hydroxylated, so long as at least one of the acyloxy radicals is hydroxylated, and thereby affords in the partial ester at least one hydroxy or ester-forming group for esterification with a carboxyl of diglycollic acid. For example, suitable partial esters for reaction with diglycollic acid may be mixed esters, such as

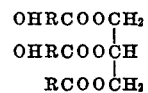

and

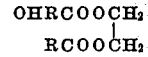

wherein OHRCOO is an hydroxylated acyloxy radical derived from an hydroxylated detergent-forming acid, such as ricinoleic acid, hydroxystearic acid, or the like, and wherein RCOO is an acyloxy group derived from a non-hydroxylated detergent-forming acid, such as oleic acid, palmitic acid, stearic acid, abietic acid, etc. Hydroxylated esters of the mixed type, such as those exemplified above, will readily react with diglycollic acid to form an ester product suitable for breaking oil field emulsions.

A wide variety of polyhydric alcohols may be employed, both of the ether and non-ether types. The following are illustrative of partial esters which are derived from polyhydric alcohols of the ether type and which are suitable for reaction with diglycollic acid.

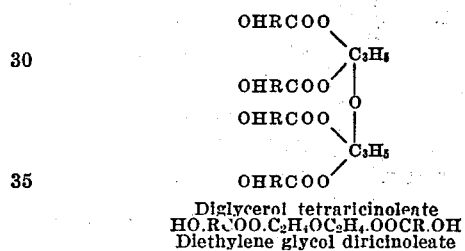

Diglycerol tetraricinoleate
HO.RCOO.C₂H₄OC₂H₄.OOCR.OH
Diethylene glycol diricinoleate Examples of other polyhydric alcohols from which suitable ester products may be derived, are triglycerol, triethylene glycol, dipropylene glycol, alphabeta gamma butane triol, beta methyl glycol glycerol ether, 1,3 propane diol, isobutylene glycol, monoethylene glycol glycerol ether, mannitol, sorbitol, sorbitol monobutyl ether, erythritol, adonitol, sorbitan, mannitan, etc.

As mentioned above, it is preferable to carry on the esterification reaction so that at least one carboxyl group remains for each polybasic carboxylic acid residue. However, those products are suitable that are produced by a reaction such that each of the carboxyl groups of the polybasic carboxy acid reacts with an alcoholiform hydroxyl. Thus, if a molecular quantity of triricinolein is heated to approximately 180° C., or higher, with one molecular quantity of diglycollic acid, the reaction product may ultimately involve two of the hydroxyls of the triricinolein, with loss of water, as indicated in the following formula:

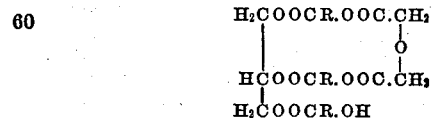

It is normally preferable, however, to control the esterification reaction so that there is at least one free carboxyl group present in the ultimate ester product. This can be accomplished by avoiding an excessively high temperature or prolonged periods of reaction. The preferred product containing at least one free carboxyl group, per molecule, is the product that is most readily prepared in commercial production.

In carrying on the esterification reaction there may develop cross linkages either through the polyhydric alcohols, or through the diglycollic acid, due to the polyfunctionality of these materials. For example, in an esterification reaction between triricinolein and diglycollic acid, the resulting product may comprise more complex molecules, such as the following, which illustrate cross linkage through the polyhydric residue.

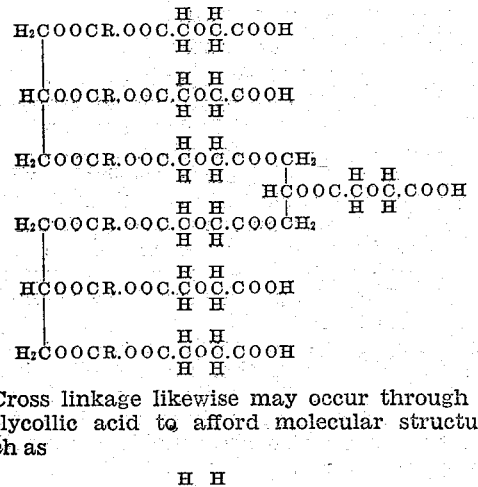

Cross linkage likewise may occur through the diglycollic acid to afford molecular structures, such as

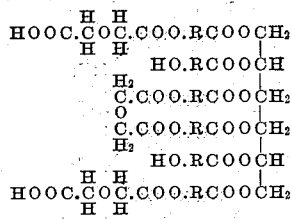

It is apparent that other cross linkages may occur. Such ester products containing more complex molecules are also suitable. It is also apparent that there may be great variations in the molecular weight of the product. The molecular weight of the ester product, as determined by cryoscopic methods, or from obvious composition of the ester, usually runs between about 300 and about 4,000 and is seldom over 6,000. Ester products having a molecular weight over about 10,000 preferably are not employed. During the esterification reaction there may be some polymerization and polymerized products as well as simple monomers may be used.

In the ester product the presence of a residual hydroxyl group is largely immaterial, provided the residual hydroxyl is not directly attached to a polyhydric alcohol residue. Any such residual hydroxyl group may be left as such, or if desired, reacted either with additional diglycollic acid, or with any monobasic detergent-forming carboxy acid. Alternatively, any such residual hydroxyl may be acylated with monocarboxy acids containing less than 8 carbon atoms. The ester product covered herein may include such simple acylated derivatives; but the finished product must contain at least one acyloxy radical derived from a detergent-forming monobasic carboxy acid having at least 8 carbon atoms in a group that is esterified with each hydroxyl group of each parent polyhydric alcohol. Referring to any residual carboxyl group or groups, it is preferable that such group or groups be left as such.

An acidic carboxylic hydrogen atom may also be replaced by reaction with an alcoholiform hydroxyl of an hydroxylated acid. The acidic hydrogen atom may also be replaced by a residue of a monohydric alcohol, e. g., aliphatic alcohols, such as methyl, ethyl, propyl, hexyl, octyl, decyl, cetyl, ceryl, etc.; alicyclic alcohols, such as cyclohexanol and the like; or aralkyl alcohols, such as benzyl alcohol, naphthyl ethyl alcohol, and the like. Similarly, the acid hydrogen may be replaced by reaction with an ether alcohol, such as those derived by reacting any of the foregoing alcohols with an alkylene oxide such as ethylene oxide, propylene oxide, butylene oxide or the like (but excluding compounds such as glycide or the like), typical other alcohols of the kind mentioned being illustrated by the following formulae:

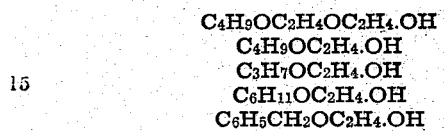

By reacting hydroxyaromatic compounds, such as phenol, naphthol and the like with an alkylene oxide, such compounds can be converted to monohydroxy aralkyl ethers which are suitable, and such compounds, together with alphyl, alicyclic and aralkyl alcohols and alcohol ethers, are regarded as alkyl alcohols and as comprising an alkyl group as the term "alkyl" is used herein. As aforesaid, aryl groups are not regarded as included in the term "alkyl" (although aralkyl groups are included). A polyhydric alcohol residue may be present in a group which replaces the acid hydrogen atom of the carboxyl group provided each hydroxyl of the alcohol is esterified with a group containing at least one acyloxy group of a detergent-forming carboxy acid having at least 8 carbon atoms. When reference is made to an ester product containing a free carboxyl group, it is intended that the product contain a COOH group, in which the acidic hydrogen atom has not been replaced. The herein described products containing a carboxylic group are intended to contemplate the acid as such, or in the form of an ester, as mentioned hereinabove. Since, however, products containing a free carboxyl are normally preferred, the additional expense of esterifying the acidic hydrogen atom of a free carboxyl usually is not justified, or in any event, is employed in connection with part of the carboxyl radicals only.

While reference has been made hereinabove to various detergent-forming monocarboxy acids, it is apparent that simple derivatives, such as the halogenated compounds, are functional equivalents. For example, chlorinated ricinoleic acid, or chlorinated triricinolein may be employed instead of ricinoleic acid or triricinolein. Brominated oleic acid may be used instead of oleic acid. Likewise, hydrogenated abietic acid may be used instead of abietic acid. In such cases, the monobasic detergent-forming carboxy material, notwithstanding modifications of the kind indicated, still has the same functional properties as the unmodified material, and thus acts in the same manner as far as esterification reactions of the character herein described are concerned. It is also possible, for example, to condense two moles of ricinoleic acid and produce one mole of monobasic diricinoleic acid. Likewise, monobasic triricinoleic acid and monobasic tetraricinoleic acid may be used. Also the condensation product of a substance such as ricinoleic acid or hydroxystearic acid, with some low molal hydroxy acid such as lactic acid, may be used. It is to be understood that the term detergent-forming monobasic carboxy acid includes such functional equivalents.

Generally speaking, the majority of the esters hereinabove described are substantially water-insoluble, i. e., are not soluble in 1 part to 1,000 parts of water at 50° F. Water solubility can be increased by obvious variants, and may be illustrated by reference to compounds derived from ethylene glycol, such as the following:

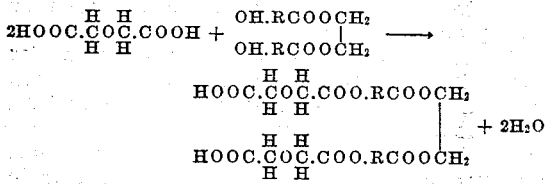

Naturally, if ethylene glycol is replaced by diethylene glycol, water solubility is enhanced. This is also true if triethylene glycol, tetraethylene glycol, or some higher homologue in the series be employed. Similarly, some other polyhydric alcohol, such as, for example, glycerol, diglycerol, sorbitol, sorbitan, pentaerythritol, or the like, can be treated with an alkylene oxide, such as ethylene oxide, propylene oxide, butylene oxide, or the like, to produce ether alcohols, or more specifically, etherified diols or etherified triols, in which the ether linkage occurs one time or perhaps several times at each original hydroxyl position. Thus, following such procedure, one may obtain compounds which are actually water-soluble. In a broader sense, then, the compounds herein contemplated may be oil-soluble, or oil-insoluble, they may be water-soluble, or water-insoluble, and may, in fact, show little or no solubility in either oil or water. This latter statement is something of a paradox, but it is to be emphasized that these esters are frequently effective at enormous dilutions, when used as demulsifiers for water-in-oil emulsions. For instance, we have repeatedly conducted experimental tests, in which the ratios employed vary from 1 part of demulsifier to 10,000, and at times up to 50,000 parts of emulsion. For practical purposes, when a compound is soluble in less than 1 part to 10,000, it is commonly referred to as "insoluble," but in such extremely dilute range the word "insoluble" is purely relative, and perhaps meaningless.

As an example of enhanced water solubility, one need only replace ethyleneglycol with non-aethyleneglycol, or some higher homologue, such as examples where $n$ in the following formula represents values from 7 to 15. Compare this formula with an analogue involving ricinoleic acid ester of ethyleneglycol:

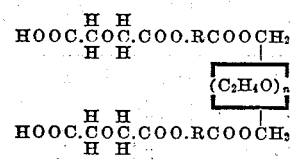

Nonaethyleneglycol hexaricinoleate, a product which is commercially available, is of distinct utility when converted into acidic glycollic acid esters.

In the preparation of esterification products, the esterification reaction may be caused to take place readily upon the application of heat, the reaction being more rapid the higher the temperature that is employed, but care should be taken not to employ excessively high temperatures which would cause decomposition. The reaction may, if desired, be in the presence of an inert solvent, such as xylene, which may be removed upon the completion of the reaction. When water is formed as a reaction product, the esterification reaction may be conducted under a reflux condenser, using a water trap to remove water as it is formed. The reaction can also be hastened by passing through the reacting materials a dried inert gas such as nitrogen or $CO_2$. A catalyst, such as toluene sulphonic acid, may be added to the extent of about one-half to 1½%, by weight, if desired. Generally speaking, however, the reactions take place rapidly, quickly and completely by simply heating substances to enter into the reaction in desired stoichiometric proportions at a temperature above the boiling point of water, usually between about 110° and 160° C., providing there is no decomposition. The most desirable products are obtained by combinations in which the ratio of moles of diglycollic acid to moles of particular material reacting therewith are within the ratios of 1 to 3 and 3 to 1.

Esterification reactions of the kind contemplated are used for the production of a wide variety of esters, resinous materials, sub-resinous materials, and include plasticizers. Attention is directed to the following patents which are a cross-section of conventional esterification procedure, which can be applied in any instance to the production of the herein contemplated esters.

British Patent No. 422,845, January 14, 1935; British Patent to Eckey, No. 500,765, February 15, 1939; U. S. Patent Nos. 2,170,030, August 22, 1939, Malm; 2,166,542, July 18, 1939, Bradley; 2,142,989, January 10, 1939, Barrett; 2,075,107, March 30, 1937, Frazier; 2,073,031, March 9, 1937, Sly; 1,951,593, May 20, 1934, Bradley; 1,909,196, May, 16, 1933, Lawson; 1,714,173, May 21, 1929, Kessler; 1,706,639, March 26, 1929, Van Schaack; 2,264,759, December 2, 1941, Jones; 1,732,392, October 12, 1929, Wietzel; and 1,993,738, March 12, 1935, Groves et al.

Attention is directed to a comprehensive article entitled "Polyhydric alcohol esters of fatty acids, their preparation, properties, and uses," by H. A. Goldsmith, in Chemical Reviews, vol. 33, December 1943, Number 3.

The following are specific examples of the preparation of preferred products, for use for the particular purposes herein indicated:

*Example 1c*

1 pound mole of triricinolein (in the form of castor oil, which ordinarily contains approximately 85 to 90% triricinolein) is reacted with one pound mole of diglycollic acid to produce a mixture of acid diglycollates consisting essentially of triricinolein monobasic diglycollate. The reaction may be caused to occur by heating the mixed materials at a temperature of approximately 140° to 170° C. for approximately 6 to 12 hours. The reaction can be followed roughly by withdrawing a small sample of the partially reacted mass and permitting it to cool on a watch crystal. When the reaction has become completed, no crystals of diglycollic acid appear. When the same no longer shows the presence of such crystals on cooling, it can be titrated with a standard volumetric alakline solution to indicate that the acidity which remains obviously is due entirely to carboxylic hydrogen and not to any unreacted diglycollic acid.

*Example 2c*

Same procedure is followed in Example 1c, except that one uses two pound moles of diglycollic acid instead of one pound mole.

Example 3c

Same procedure as followed in Example 1c, preceding, except that 2½ to 2¾ pound moles of diglycollic acid are used for each pound mole of triricinolein.

Examples 4c, 5c, and 6c

Same procedure as is employed in the preceding three examples, except that a temperature of approximately 150 to 180° C. is employed, i. e., Example 4c corresponding to Example 1c, 5c to 2c, and 6c to 3c.

Examples 7c, 8c, and 9c

The same procedure was followed as in Examples 1c to 3c, preceding, except that a temperature of 180° to 200° C. was employed, i. e., Example 7c corresponds to Example 1c, 8c to 2c, and 9c to 3c.

Example 10c

The neutral ester derived from ricinoleic acid and pentaerythritol is substituted for triricinolein in previous Examples 1c to 6c, inclusive, and the ratio of diglycollic acid is changed so as to correspond to one pound mole, two pound moles, three pound moles, and 3½ pound moles for each pound mole of pentaerythritol tetraricinoleate.

Example 11c

The neutral ester derived from ricinoleic acid and ethylene glycol, i. e., ethylene glycol diricinoleate, is substituted for triricinolein, in preceding Examples 1c to 9c, inclusive, except that the ratio of diglycollic acid is changed to correspond to one and also to 1½ pound moles of the dicarboxy acid for each mole of ethylene glycol diricinoleate.

Example 12c

The same procedure is followed as in Example 11c, preceding, except that glycols which enhance the hydrophile property are employed, as, for example, diethylene glycol diricinoleate, triethylene glycol diricinoleate, tetraethylene glycol diricinoleate, hexaethylene glycol diricinoleate, and nonaethylene glycol diricinoleate.

PART 4

As previously stated, the demulsifying agents herein described are mechanical mixtures of two other types of materials: (1) An acidic partial ester which has recognized demulsifying properties; and (2) An oxyalkylated derivative which normally does not exhibit any demulsifying properties, at least not to a sufficient degree as to justify characterization.

In the first two preceding parts there have been given descriptions of how to prepare the oxyalkylated derivatives; in the third part there has been a description given of the preparation of acidic partial esters. These two materials are mixed so that the oxyalkylated resin consists of 60 to 80 parts of the mixture on a solvent-free basis, and the partial acidic ester supplies 40 to 20 parts of the mixture on a solvent-free basis. Needless to say, after the mixture has been prepared solvents can be added to give a convenient dilution of the final product, or if desired, the solvent may be present in either ingredient prior to mixing. Mixing is done by any suitable mechanical agitation at room temperature or slightly above, i. e., 30° to 40° C. The mixture invariably give homogeneous products, although in a few instances we have added a bit more of a polar solvent or oxygen-containing solvent such as propyl alcohol, butyl alcohol, cresylic acid, the diethylether of ethyleneglycol, diethylether of diethyleneglycol, acetone, or the like, or any of the other solvents mentioned elsewhere herein, such as high boiling aromatic ptroleum solvents, so as to make the solution absolutely clear or transparent.

Of all the acidic esters employed, we prefer those derived from castor oil, triricinolein and particularly those identified as 5c, 6c, 8c and 9c, preceding. Of the oxyalkylated derivatives, we prefer those obtained by use of ethylene oxide, and particularly where substantially one mole of ethylene oxide has been added per phenolic nucleus originally present in the resin. By "substantially one mole" we mean anywhere from .85 of a mole to 1.15 moles. Out of a large number of mixtures which we have prepared, the following table summarizes more than 100 of such mixtures. These particular units were obtained from the preferable components, to wit, the partial acidic esters 5, 6, 8 and 9, and from oxyethylated resins in which substantially one mole of ethylene oxide had been added. These series of resins contained a certain amount of solvent, generally xylene, as previously described in Part 2 and indicated by numbers 104b, 109b, 114b, etc.

In the table the first column indicates the mixture example number beginning with 1d, 2d, etc.; the second column indicates the particular solvent-containing oxyalkylated resin employed and specifies the example number, such as 104b, 109b, 114b, etc.; the third column indicates the pounds of such material, including the solvent employed in the mix; the fourth column identifies the particular partial acidic ester employed and previously described in Part 3, as 5c, 6c, etc.; and the fifth column shows the pounds of partial acidic ester used in the mixture.

All these mixtures were prepared by simply stirring the compounds together at room temperature or slightly above, to wit, 30° to 40° C., until the mixture was homogeneous. It will be noted that in these mixtures two ratios were employed— a 2 to 1 mixture and a 3 to 1 mixture. The latter, i. e., 3 parts of the oxyalkylated compound and 1 part of the partial acidic ester, gave mixtures which were most advantageous for breaking oil field emulsions.

| Mixture Ex. No. | Oxyalkylated Resin Ex. No. | Lbs. Used Solvent Included | Partial Acidic Ester Ex. No. | Lbs. Used in Mix |
|---|---|---|---|---|
| 1d | 104b | 34.0 | 5c | 10.0 |
| 2d | 104b | 34.0 | 5c | 6.0 |
| 3d | 104b | 34.0 | 6c | 10.0 |
| 4d | 104b | 34.0 | 6c | 6.0 |
| 5d | 104b | 34.0 | 8c | 10.0 |
| 6d | 104b | 34.0 | 8c | 6.0 |
| 7d | 104b | 34.0 | 9c | 10.0 |
| 8d | 104b | 34.0 | 9c | 6.0 |
| 9d | 109b | 33.0 | 5c | 9.0 |
| 10d | 109b | 33.0 | 5c | 6.0 |
| 11d | 109b | 33.0 | 6c | 9.0 |
| 12d | 109b | 33.0 | 6c | 6.0 |
| 13d | 109b | 33.0 | 8c | 9.0 |
| 14d | 109b | 33.0 | 8c | 6.0 |
| 15d | 109b | 33.0 | 9c | 9.0 |
| 16d | 109b | 33.0 | 9c | 6.0 |
| 17d | 114b | 33.25 | 5c | 8.5 |
| 18d | 114b | 33.25 | 5c | 6.3 |
| 19d | 114b | 33.25 | 6c | 8.5 |
| 20d | 114b | 33.25 | 6c | 6.3 |
| 21d | 114b | 33.25 | 8c | 8.5 |
| 22d | 114b | 33.25 | 8c | 6.3 |
| 23d | 114b | 33.25 | 9c | 8.5 |
| 24d | 114b | 33.25 | 9c | 6.3 |
| 25d | 119b | 33.0 | 5c | 9.65 |
| 26d | 119b | 33.0 | 5c | 6.40 |
| 27d | 119b | 33.0 | 6c | 9.65 |

| Mixture Ex. No. | Oxyalkylated Resin Ex. No. | Lbs. Used Solvent Included | Partial Acidic Ester Ex. No. | Lbs. Used in Mix |
|---|---|---|---|---|
| 28d | 119b | 33.0 | 6c | 6.40 |
| 29d | 119b | 33.0 | 8c | 9.65 |
| 30d | 119b | 33.0 | 8c | 6.40 |
| 31d | 119b | 33.0 | 9c | 9.65 |
| 32d | 119b | 33.0 | 9c | 6.40 |
| 33d | 124b | 34.25 | 5c | 10.00 |
| 34d | 124b | 34.25 | 5c | 6.65 |
| 35d | 124b | 34.25 | 6c | 10.00 |
| 36d | 124b | 34.25 | 6c | 6.65 |
| 37d | 124b | 34.25 | 8c | 10.00 |
| 38d | 124b | 34.25 | 8c | 6.65 |
| 39d | 124b | 34.25 | 9c | 10.00 |
| 40d | 124b | 34.25 | 9c | 6.65 |
| 41d | 129b | 32.75 | 5c | 10.00 |
| 42d | 129b | 32.75 | 5c | 6.60 |
| 43d | 129b | 32.75 | 6c | 10.00 |
| 44d | 129b | 32.75 | 6c | 6.60 |
| 45d | 129b | 32.75 | 8c | 10.60 |
| 46d | 129b | 32.75 | 8c | 6.60 |
| 47d | 129b | 32.75 | 9c | 10.00 |
| 48d | 129b | 32.75 | 9c | 6.60 |
| 49d | 134b | 32.7 | 5c | 10.8 |
| 50d | 134b | 32.7 | 5c | 7.a |
| 51d | 134b | 32.7 | 6c | 10.8 |
| 52d | 134b | 32.7 | 6c | 7.2 |
| 53d | 134b | 32.7 | 8c | 10.8 |
| 54d | 134b | 32.7 | 8c | 7.2 |
| 55d | 134b | 32.7 | 9c | 10.8 |
| 56d | 134b | 32.7 | 9c | 7.2 |
| 57d | 139b | 30.5 | 5c | 10.0 |
| 58d | 139b | 30.5 | 5c | 6.6 |
| 59d | 139b | 30.5 | 6c | 10.0 |
| 60d | 139b | 30.5 | 6c | 6.6 |
| 61d | 139b | 30.5 | 8c | 10.0 |
| 62d | 139b | 30.5 | 8c | 6.6 |
| 63d | 139b | 30.5 | 9c | 10.0 |
| 64d | 139b | 30.5 | 9c | 6.6 |
| 65d | 144b | 33.7 | 5c | 10.8 |
| 66d | 144b | 33.7 | 5c | 7.2 |
| 67d | 144b | 33.7 | 6c | 10.8 |
| 68d | 144b | 33.7 | 6c | 7.2 |
| 69d | 144b | 33.7 | 8c | 10.8 |
| 70d | 144b | 33.7 | 8c | 7.2 |
| 71d | 144b | 33.7 | 9c | 10.8 |
| 72d | 144b | 33.7 | 9c | 7.2 |
| 73d | 149b | 33.6 | 5c | 9.9 |
| 74d | 149b | 33.6 | 5c | 6.6 |
| 75d | 149b | 33.6 | 6c | 9.9 |
| 76d | 149b | 33.6 | 6c | 6.6 |
| 77d | 149b | 33.6 | 8c | 9.9 |
| 78d | 149b | 33.6 | 8c | 6.6 |
| 79d | 149b | 33.6 | 9c | 9.9 |
| 80d | 149b | 33.6 | 9c | 6.6 |
| 81d | 154b | 34.6 | 5c | 11.9 |
| 82d | 154b | 34.6 | 6c | 7.9 |
| 83d | 154b | 34.6 | 6c | 11.9 |
| 84d | 154b | 34.6 | 6c | 7.9 |
| 85d | 154b | 34.6 | 8c | 11.9 |
| 86d | 154b | 34.6 | 8c | 7.9 |
| 87d | 154b | 34.6 | 9c | 11.9 |
| 88d | 154b | 34.6 | 9c | 7.9 |
| 89d | 161b | 33.4 | 5c | 10.7 |
| 90d | 161b | 33.4 | 5c | 7.1 |
| 91d | 161b | 33.4 | 6c | 10.7 |
| 92d | 161b | 33.4 | 6c | 7.1 |
| 93d | 161b | 33.4 | 8c | 10.7 |
| 94d | 161b | 33.4 | 8c | 7.1 |
| 95d | 161b | 33.4 | 9c | 10.7 |
| 96d | 161b | 33.4 | 9c | 7.1 |
| 97d | 166b | 32.9 | 5c | 10.0 |
| 98d | 166b | 32.9 | 5c | 6.6 |
| 99d | 166b | 32.9 | 6c | 10.0 |
| 100d | 166b | 32.9 | 6c | 6.6 |
| 101d | 166b | 32.9 | 8c | 10.0 |
| 102d | 166b | 32.9 | 8c | 6.0 |
| 103d | 166b | 32.9 | 9c | 10.0 |
| 104d | 166b | 32.9 | 9c | 6.6 |
| 105d | 171b | 31.9 | 5c | 10.5 |
| 106d | 171b | 31.9 | 5c | 7.0 |
| 107d | 171b | 31.9 | 6c | 10.5 |
| 108d | 171b | 31.9 | 6c | 7.0 |
| 109d | 171b | 31.9 | 8c | 10.5 |
| 110d | 171b | 31.9 | 8c | 7.0 |
| 111d | 171b | 31.9 | 9c | 10.5 |
| 112d | 171b | 31.9 | 9c | 7.0 |
| 113d | 176b | 32.3 | 5c | 9.8 |
| 114b | 176b | 32.3 | 5c | 6.5 |
| 115d | 176b | 32.3 | 6c | 9.8 |
| 116d | 176b | 32.3 | 6c | 6.5 |
| 117d | 176b | 32.3 | 8c | 19.8 |
| 118d | 176b | 32.3 | 8c | 6.5 |
| 119d | 176b | 32.3 | 9c | 9.8 |
| 120d | 176b | 32.8 | 9c | 6.5 |

PART 5

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsion with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 7d, with 10 parts by weight of xylene and 10 parts by weight of isopropyl alcohol, an excellent demulsifier is obtained. Selection of the solvent will vary, depending upon the solubility characteristics of the oxyalkylated product, and of course, will be dictated in part by economic considerations, i. e. cost.

Having thus described our invention, what we claim as new and desire to secure by Letters Patent is:

1. A process for breaking petroleum emulsions of the water-in-oil type, characterized by subjecting the emulsion to the action of a demulsifier consisting of a mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from an hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical; and the second component is the oxyalkylation product of (A) An alpha-beta alkylene oxide having not more than 4 carbon atoms and selected from the class consisting of ethylene oxide, glycide and methylglycide, and (B) An oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

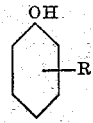

in which R is a hydrocarbon radical having at least 4 and not more than 18 carbon atoms and substituted in the 2,4,6 position; said oxyalkylated resin being characterized by the introduction into the resin molecule of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than 2 moles of alkylene oxide be introduced for each phenolic nucleus; the first component being 20% to 40% by weight of the mixture and the second component being 80% to 60% by weight of the mixture.

2. A process for breaking petroleum emulsions of the water-in-oil type, characterized by subjecting the emulsion to the action of a demulsifier consisting of a mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from a hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical; and the second component is the oxyethylation product of (A) Ethylene oxide, and (B) An oxyethylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

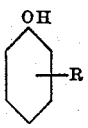

in which R is a hydrocarbon radical having at least 4 and not more than 18 carbon atoms and substituted in the 2,4,6 position; said oxyethylated resin being characterized by the introduction into the resin molecule of a plurality of divalent radicals having the formula $C_2H_4O$; with the proviso that from about one-half to less than 2 moles of ethylene oxide be introduced for each phenolic nucleus; the first component being 20% to 40% by weight of the mixture and the second component being 80% to 60% by weight of the mixture.

3. A process for breaking petroleum emulsions of the water-in-oil type, characterized by subjecting the emulsion to the action of a demulsifier consisting of a mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from a hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical; and the second component is the oxyethylation product of (A) Ethylene oxide, and (B) An oxyethylation-susceptible, fusible, organic solvent-soluble, water insoluble, low-stage phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive toward said phenol; said resin being formed in the substantial absence of trifunctional phenols; said phenol being of the formula:

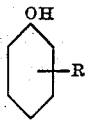

in which R is a hydrocarbon radical having at least 4 and not more than 18 carbon atoms and substituted in the 2,4,6 position; said oxyethylated resin being characterized by the introduction into the resin molecule of a plurality of divalent radicals having the formula $C_2H_4O$; with the proviso that from about one-half to less than 2 moles of ethylene oxide be introduced for each phenolic nucleus; the first component being 20% to 40% by weight of the mixture and the second component being 80% to 60% by weight of the mixture.

4. A process for breaking petroleum emulsions of the water-in-oil type, characterized by subjecting the emulsion to the action of a demulsifier consisting of a mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from a hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical; and the second component is the oxyethylation product of (A) Ethylene oxide, and (B) An oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive toward said phenol; said resin being formed in the substantial absence of trifunctional phenols; said phenol being of the formula:

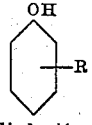

in which R is an aliphatic hydrocarbon radical having at least 4 and not more than 18 carbon atoms and substituted in the 2,4,6 position; said oxyethylated resin being characterized by the introduction into the resin molecule of a plurality of divalent radicals having the formula $C_2H_4O$; with the proviso that from about one-half to less than 2 moles of ethylene oxide be introduced for each phenolic nucleus; the first component being 20% to 40% by weight of the mixture and the second component being 80% to 60% by weight of the mixture.

5. A process for breaking petroleum emulsions of the water-in-oil type, characterized by subjecting the emulsion to the action of a demulsifier consisting of a mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from an hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical; and the second component is the oxyethylation product of (A) Ethylene oxide, and (B) An oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aliphatic aldehyde having not over 8 carbon atoms and reactive toward said phenol; said resin being formed in the substantial absence of trifunctional phenols; said phenol being of the formula:

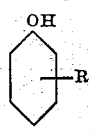

in which R is an aliphatic hydrocarbon radical having at least 4 and not more than 18 carbon atoms and substituted in the 2,4,6 position; said oxyethylated resin being characterized by the introduction into the resin molecule of a plurality of divalent radicals having the formula $C_2H_4O$; with the proviso that from about one-half to less than 2 moles of ethylene oxide be introduced for each phenolic nucleus; the first component being 20% to 40% by weight of the mixture and the second component being 80% to 60% by weight of the mixture.

6. A process for breaking petroleum emulsions of the water-in-oil type, characterized by subjecting the emulsion to the action of a demulsifier consisting of a mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from a hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical; and the second component is the oxyethylation product of (A) Ethylene oxide; and (B) An oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of trifunctional phenols; said phenol being of the formula:

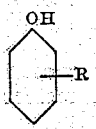

in which R is an aliphatic hydrocarbon radical having at least 4 and not more than 18 carbon atoms and substituted in the 2,4,6 position; said oxyethylated resin being characterized by the introduction into the resin molecule of a plurality of divalent radicals having the formula $C_2H_4O$; with the proviso that from about one-half to less than 2 moles of ethylene oxide be introduced for each phenolic nucleus; the first component being 20% to 40% by weight of the mixture and the second component being 80% to 60% by weight of the mixture.

7. A process for breaking petroleum emulsions of the water-in-oil type, characterized by subjecting the emulsion to the action of a demulsifier consisting of a mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from an hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical; and the second component is the oxyethylation product of (A) Ethylene oxide, and (B) An oxyethylation-susceptible, fusible, organic solvent-soluble, water-insoluble, low-stage, acid catalyzed phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of trifunctional phenols; said phenol being of the formula:

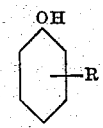

in which R is an aliphatic hydrocarbon radical having at least 4 and not more than 18 carbon atoms and substituted in the 2,4,6 position; said oxyethylated resin being characterized by the introduction into the resin molecule of a plurality of divalent radicals having the formula C₂H₄O; with the proviso that from one-half to less than 2 moles of ethylene oxide be introduced for each phenolic nucleus; the first component being 20% to 40% by weight of the mixture and the second component being 80% to 60% by weight of the mixture.

8. The process of claim 7, wherein the ratio of ethylene oxide employed in the manufacture of the second component is substantially a molal ratio of 1 to 1, based on the phenolic hydroxyl present in the phenol entering into the resin manufacture.

9. The process of claim 7, wherein the ratio of ethylene oxide employed in the manufacture of the second component is substantially a molal ratio of 1 to 1, based on the phenolic hydroxyl present in the phenol entering into the resin manufacture, and the ratio of the first component to the second component being 1 to 3.

10. The process of claim 7, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component contains only one polyhydric alcohol radical and all detergent-forming monocarboxy acyloxy radicals are ricinoleic acid radicals.

11. The process of claim 7, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component is a triricinolein diglycollate.

12. The process of claim 7, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component is triricinolein mono-diglycollate.

13. The process of claim 7, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component is triricinolein di-diglycollate.

14. The process of claim 7, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component is triricinolein tri-diglycollate.

MELVIN DE GROOTE.
ARTHUR F. WIRTEL.

REFERENCES CITED

The following references are of record in the file of this patent:

UNITED STATES PATENTS

| Number | Name | Date |
|---|---|---|
| 2,442,073 | De Groote et al. | May 25, 1948 |
| 2,454,541 | Bock et al. | Nov. 23, 1948 |